United States Patent
Morimoto et al.

(10) Patent No.: US 7,931,999 B2
(45) Date of Patent: Apr. 26, 2011

(54) POLYMER ELECTROLYTE FUEL CELL AND MANUFACTURING METHOD FOR ELECTRODE-MEMBRANE-FRAME ASSEMBLY

(75) Inventors: Takashi Morimoto, Osaka (JP); Hiroki Kusakabe, Osaka (JP); Toshihiro Matsumoto, Osaka (JP); Norihiko Kawabata, Osaka (JP); Mitsuo Yoshimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/307,014

(22) PCT Filed: Mar. 27, 2008

(86) PCT No.: PCT/JP2008/000746
§ 371 (c)(1),
(2), (4) Date: Dec. 30, 2008

(87) PCT Pub. No.: WO2008/129839
PCT Pub. Date: Oct. 30, 2008

(65) Prior Publication Data
US 2009/0286123 A1 Nov. 19, 2009

(30) Foreign Application Priority Data
Mar. 30, 2007 (JP) .................................. 2007-091986

(51) Int. Cl.
*H01M 8/00* (2006.01)
*H01M 8/10* (2006.01)
(52) U.S. Cl. ......... 429/535; 429/400; 429/483; 429/482
(58) Field of Classification Search .................... 429/30, 429/535, 400, 482, 483
See application file for complete search history.

(56) References Cited

U.S. PATENT DOCUMENTS

| 6,319,625 | B1 | 11/2001 | Gemberling |
| 6,667,124 | B2 | 12/2003 | Suenaga et al. |
| 2002/0034670 | A1 | 3/2002 | Suenaga et al. |
| 2003/0082430 | A1 | 5/2003 | Suzuki |
| 2003/0091885 | A1* | 5/2003 | Kobayashi et al. ............. 429/32 |
| 2005/0084734 | A1 | 4/2005 | Kobayashi et al. |

FOREIGN PATENT DOCUMENTS

| JP | 2002-042836 | 2/2002 |
| JP | 2005-100970 | 4/2005 |
| JP | 2005-268077 | 9/2005 |
| JP | 2006-310288 | 11/2006 |
| JP | 2008-010350 | 1/2008 |
| WO | 02/061869 | 8/2002 |
| WO | 2006/106908 | 10/2006 |

OTHER PUBLICATIONS

Office Action dated Sep. 30, 2010 in U.S. Appl. No. 12/707,894, filed Feb. 18, 2010 (Morimoto et al.), which is a continuation of the present application.

(Continued)

*Primary Examiner* — Patrick Ryan
*Assistant Examiner* — Helen O Conley
(74) *Attorney, Agent, or Firm* — Wenderoth, Lind & Ponack, L.L.P.

(57) ABSTRACT

In a manufacturing method for an electrode-membrane-frame assembly in a fuel cell, a first frame member and an electrolyte membrane member are arranged in a first mold for injection molding such that the edge of the electrolyte membrane member is arranged on the first frame member, a second mold is arranged to form a resin flow passage for forming a second frame member which is in contact with the first frame member by interposing the electrolyte membrane member, and a part of the edge of the electrolyte membrane member is pressed and fixed to the first frame member by a presser member mounted on the second mold and a molding resin material is injected into the resin flow passage to form a second frame member.

6 Claims, 21 Drawing Sheets

OTHER PUBLICATIONS

International Preliminary Report on Patentability and Written Opinion of the International Searching Authority issued Oct. 6, 2009 in International (PCT) Application No. PCT/JP2008/000746 (including English translation).

* cited by examiner

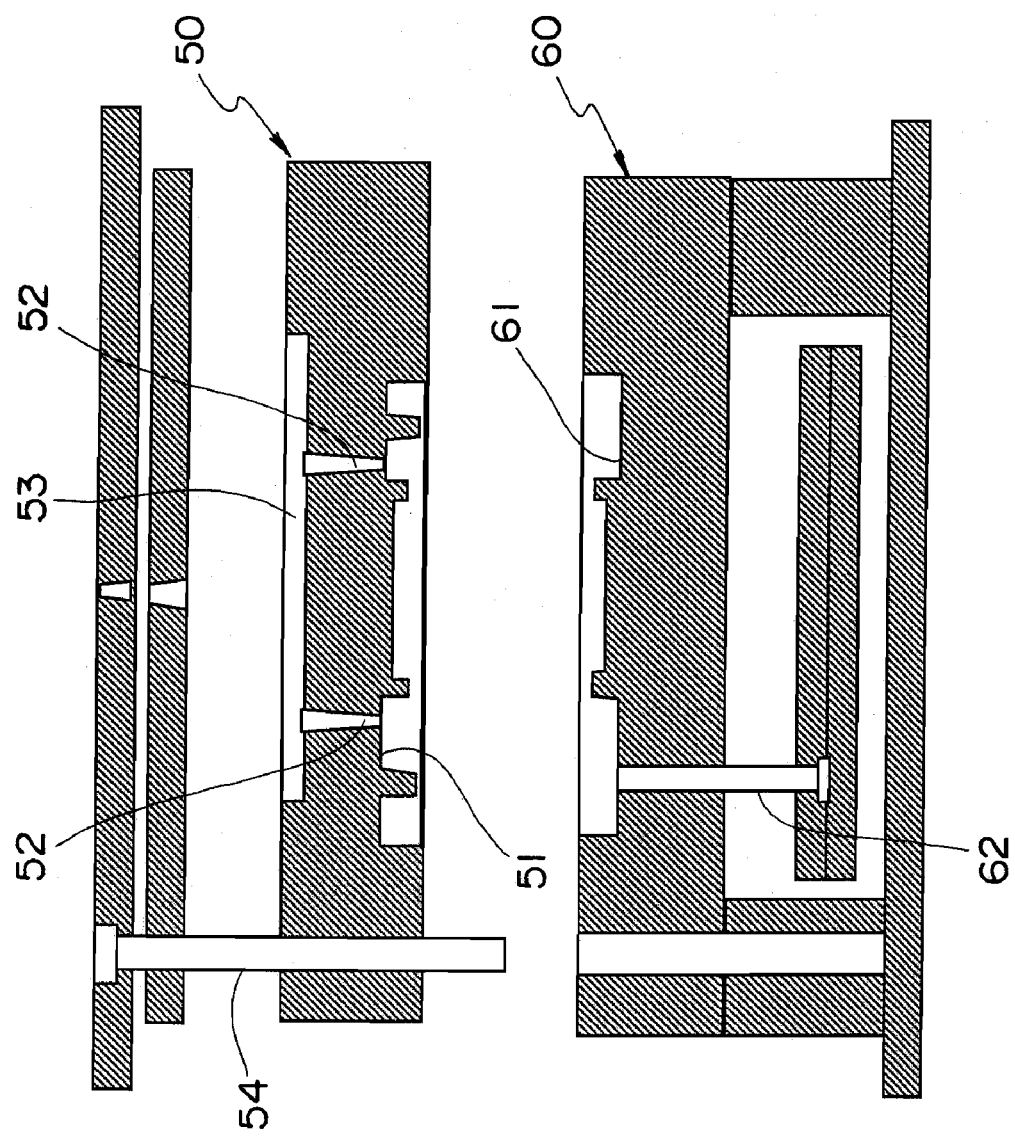

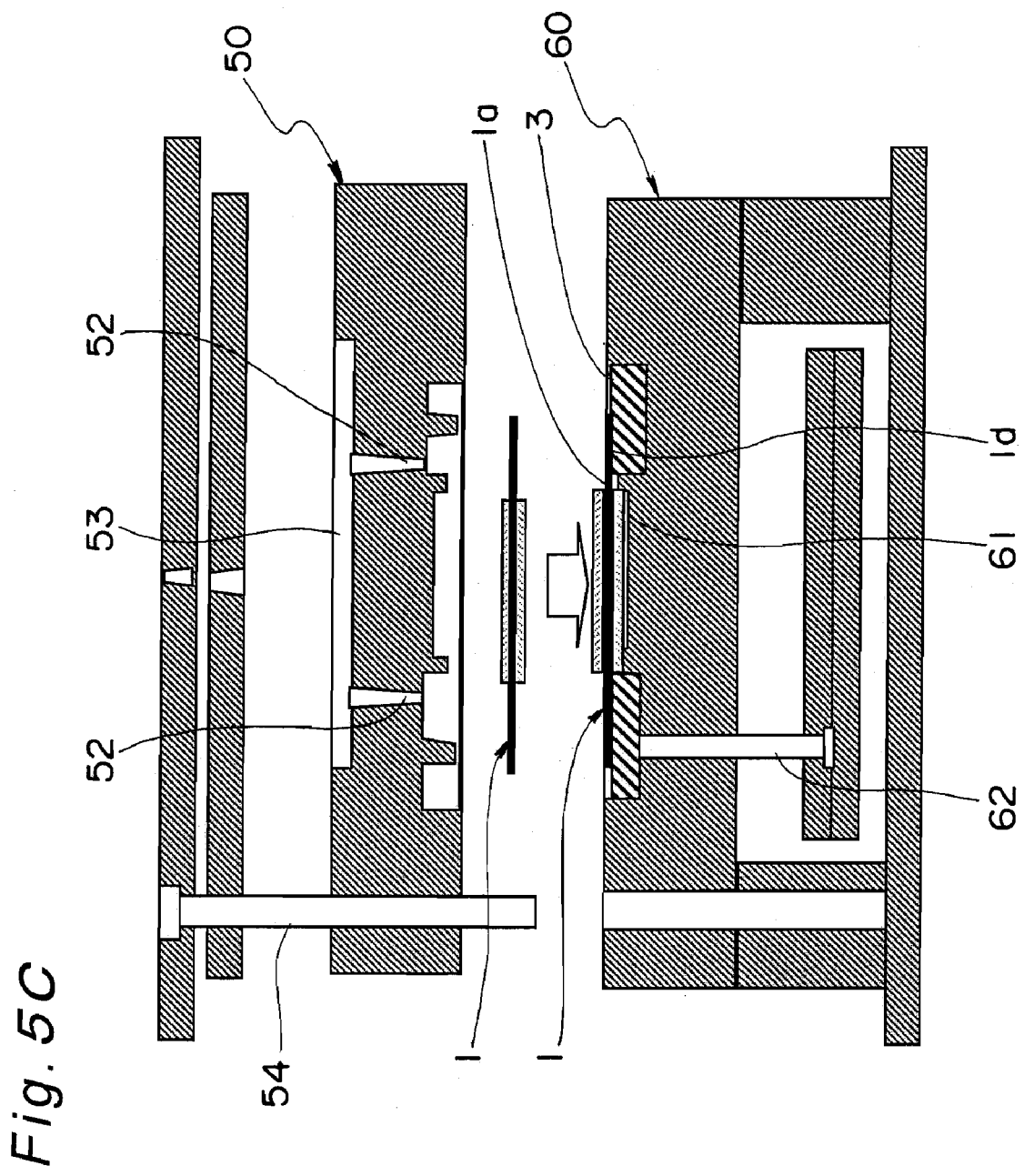

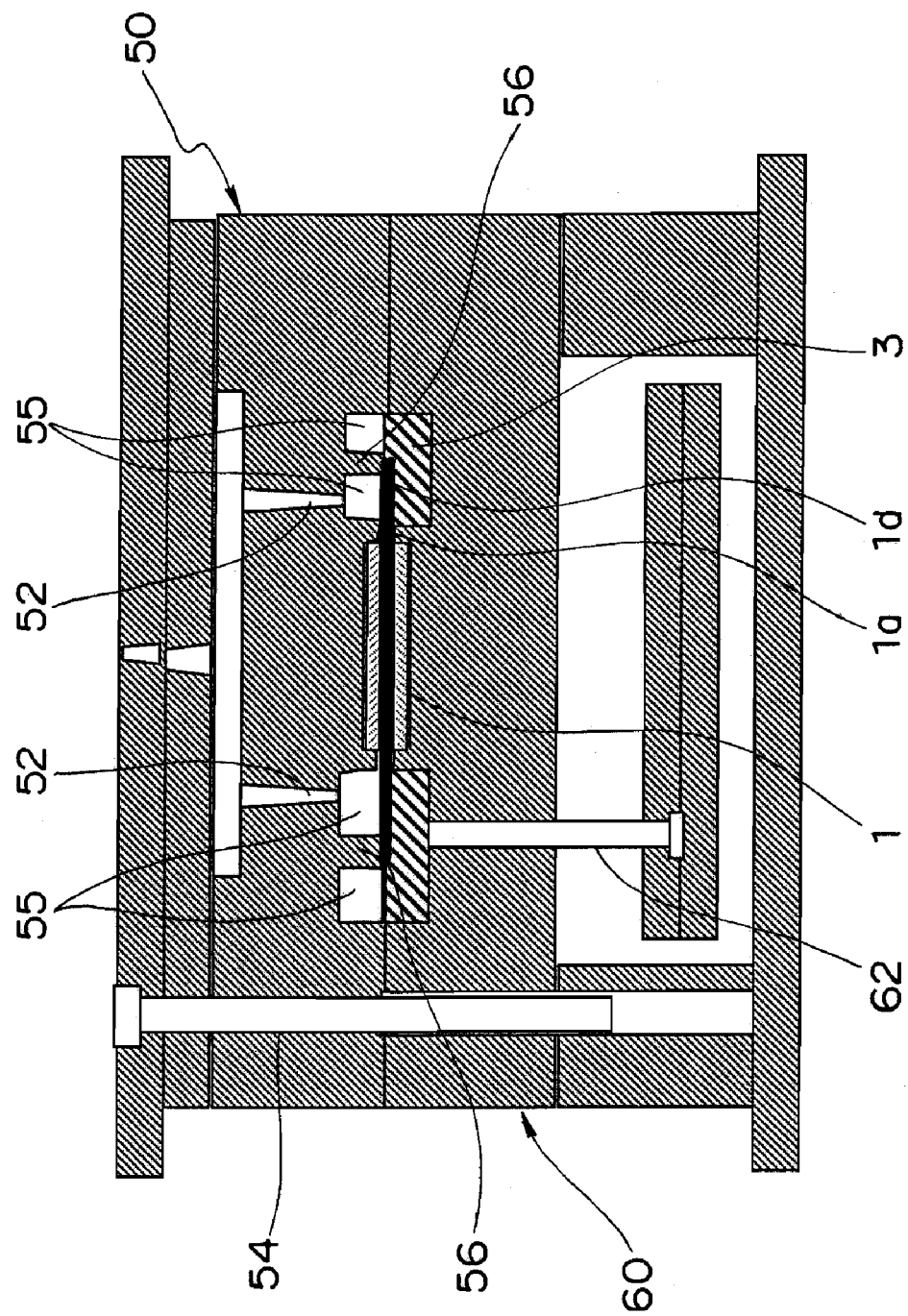

POLYMER ELECTROLYTE FUEL CELL AND MANUFACTURING METHOD FOR ELECTRODE-MEMBRANE-FRAME ASSEMBLY

TECHNICAL FIELD

The present invention relates to a solid polymer electrolyte fuel cell, and particularly, to an improvement in the structure of an electrode-membrane-frame assembly in a fuel cell and a manufacturing method for the same.

BACKGROUND ART

In conventional solid polymer electrolyte fuel cells, a single cell module is used which is constituted by sandwiching a MEA-frame assembly in which a membrane electrode assembly (MEA) is supported by a frame provided with a gasket arranged around its periphery for sealing gas between an anode side electroconductive separator plate and a cathode side electroconductive separator plate. The MEA is constituted of a polymer electrolyte membrane, and an anode bound to one side of this polymer electrolyte membrane and a cathode bound to other side of the polymer electrolyte membrane. Gas supply sections are furthermore formed on the periphery of each separator plate to supply fuel gas to the anode and oxidizer gas to the cathode of the MEA respectively.

The structure of such a conventional solid polymer electrolyte fuel cell is disclosed in, for example, Patent Document 1. Specifically, as shown in FIG. 15, a structure in which an electrode-membrane-frame assembly 303 where the periphery of an electrode (MEA) 302 corresponding to the polymer electrolyte membrane is supported in the inside of a frame 300 is sandwiched between each of separators 301.

Further, such an electrode 302, namely, the polymer electrolyte membrane is incorporated into almost the center of the thickness of the frame 300 and as a binding method thereof, a thermal pressure bonding method, and a method using an adhesive, a mechanical cramp or the like are adopted.

Further, besides the above methods, a method in which a MEA body is arranged in a mold to form a frame bound to the MEA body by injection molding (see Patent Document 2) and a method in which a separator is arranged in a mold to form a frame bound to the separator by injection molding (see Patent Document 3) are disclosed.

Patent Document 1: JP-A No. 2005-100970
Patent Document 2: JP-A No. 2006-310288
Patent Document 3: JP-A No. 2005-268077

SUMMARY OF INVENTION

Problems to be Solved by the Invention

However, the binding method of the polymer electrolyte membrane using adhesives has the possibility of bringing about deterioration in the performance of the polymer electrolyte membrane caused by the volatile components of the adhesives and is therefore limited in its applicable condition. Further, the binding method using a mechanical cramp gives rise to the problem that the cross-leak from a fine clearance between the polymer electrolyte membrane and the frame easily occurs. Here, the cross leak is the phenomenon that in FIG. 15, a part of gas supplied to the inside of the battery passes through a slight clearance between the inner periphery of a frame 300 and a electrode 302 and leaks from one of the anode side or cathode side to the other. In order to enhance the efficiency of power generation in a fuel cell, it is necessary to decrease this cross leak.

As one of methods for reducing this cross leak, it can be considered that a method in which a frame is formed by injection molding such that the periphery of the electrolyte membrane is arranged inside of the frame. This method makes it possible to enhance the adhesion between the frame and the periphery of the electrolyte membrane and therefore, the cross leak can be reduced.

Specifically, as shown in FIG. 16A, a first frame member 311 formed into a frame shape by injection molding or the like in advance is prepared. Next, as shown in FIG. 16B, a MEA 314 provided with an anode and a cathode on both surfaces of an electrolyte membrane 313 is arranged in such a manner that its periphery, that is, a periphery 313a of the electrolyte membrane 313 is positioned and arranged on the surface of the first frame member 311. Thereafter, as shown in FIG. 16C, a resin material is injected onto the surface of the first frame member 311 on which the periphery 313a of the electrolyte membrane 313 is arranged to form a second frame member 312 by injection molding. The second member 312 is formed by binding integrally with the first frame member 311 by injection molding in this manner, whereby the periphery 313a of the electrolyte membrane 313 which is in the condition where it is sandwiched between these frame members can be supported in more closely contact state between the first frame member 311 and the second frame member 312.

However, the method in which the MEA-frame assembly 310 is formed by injection molding has the following problem. When, as shown in FIG. 17A, a high-temperature and high pressure resin material P is injected into a mold (not shown) in the formation of the second frame member 312 by injection molding, the periphery 313a of the electrolyte membrane 313 arranged on the upper surface of the first frame member 311 is floated in the resin material by the flow resistance of the resin material P, so that there is the case where the periphery 313a of the electrolyte membrane 313 is separated from the upper surface of the first frame member 311 and floated. If the resin material P is cured in this condition, this results in that the periphery 313a of the electrolyte membrane 313 is, as shown in FIG. 17B, completely floated apart from the surface of the first frame member 311 inside of the second frame member 312, to support MEA 314.

In such a case, there is the possibility of the occurrence of the case where MEA 314 is insufficiently supported in the MEA-frame assembly 310 and the case where the electrolyte membrane 313 is damaged, giving rise to the problem that the cross leak can be insufficiently reduced.

In the method disclosed in Patent Document 2, there is also the possibility of the MEA body being floated in the mold. Further, the subject of Patent Document 3 is directed only to a separator having relatively high rigidity.

Therefore, it is an object of the present invention to solve the above problem and to provide a manufacturing method for an electrode-membrane frame assembly to be used in a polymer electrolyte fuel cell, which enhances binding property between the polymer electrolyte membrane and the frame so that the polymer electrolyte membrane can be surely supported and which efficiently suppresses the cross leak phenomenon to thereby improve the performance of the polymer electrolyte fuel cell, and to provide a polymer electrolyte fuel cell, in the electrode-membrane-frame assembly of the fuel cell.

Means to Solving the Problem

In order to achieve the above object, the present invention is constructed as follows.

According to a first aspect of the present invention, there is provided a manufacturing method for an electrode-membrane-frame assembly used in a polymer electrolyte fuel cell assembled by stacking a plurality of single cell modules each comprising an electrode-membrane-frame assembly which is formed of a membrane electrode assembly constituted by binding an anode electrode to one surface of a polymer electrolyte membrane member and binding a cathode electrode to the other surface of the electrolyte membrane member and a frame which contains a gas supply section that supplies fuel gas and oxidizer gas to the anode electrode and the cathode electrode respectively and which sandwiches the periphery of the membrane electrode assembly to hold the membrane electrode assembly; and a pair of separators which sandwich the electrode-membrane-frame assembly from the anode side and the cathode side, the method comprising:

arranging a first frame member and the membrane electrode assembly in a first mold for injection molding such that an edge of the electrolyte membrane member in the membrane electrode assembly is arranged on the first frame member;

arranging a second mold on the first mold to form a resin flow passage for forming a second frame member, the second mold being in contact with the first frame member by interposing the electrolyte membrane member, and pressing and fixing a part of the edge of the electrolyte membrane member to the first frame member by a presser member mounted on the second mold;

injecting a molding resin material into the resin flow passage to fill the resin material in the resin flow passage in the condition where the electrolyte membrane member is fixed by the presser member; and curing the filled resin material to form a second frame member which is bound to the first frame member integrally in the resin flow passage and sandwiches the edge of the electrolyte membrane member between the second frame member and the first frame member to hold the edge of the electrolyte membrane member.

According to a second aspect of the present invention, there is provided the manufacturing method for the electrode-membrane-frame assembly as defined in the first aspect, wherein the fixation of the electrolyte membrane member is carried out by sandwiching a first position between the first and second molds to hold the first position along the periphery of the anode electrode or the cathode electrode, the first position being in contact with the outer periphery of the electrode in the electrolyte membrane member, and by pressing and fixing a plurality of second positions on the outside of the first position in the edge of the electrolyte membrane member to the first frame member by a plurality of the presser members.

According to a third aspect of the present invention, there is provided the manufacturing method for the electrode-membrane-frame assembly as defined in the second aspect, wherein the injection of the resin material into the resin flow passage is carried out through an injection part which is arranged between the first position and second position.

According to a fourth aspect of the present invention, there is provided the manufacturing method for the electrode-membrane-frame assembly as defined in the second aspect, wherein the fixation of the electrolyte membrane member by the plurality of presser members is carried out at the plurality of second positions arranged at specified intervals along the outer periphery of the electrolyte membrane member.

According to a fifth aspect of the present invention, there is provided the manufacturing method for an electrode-membrane-frame assembly as defined in the first aspect, wherein the first frame member is provided with a step part to arrange the edge of the electrolyte membrane member and the resin material is filled in the step part so as to fill the step part in a condition where the edge of the electrolyte membrane member is arranged on a lower step surface in the step part and the electrolyte membrane member is fixed to the lower step surface by the presser member, thereby forming the second frame member.

According to a sixth aspect of the present invention, there is provided the manufacturing method for the electrode-membrane-frame assembly as defined in the fifth aspect, wherein the first frame member is further provided with an injection step part at a position opposite to the resin material injection part in the upper step surface of the step part, the step difference between the lower step surface of the step part and the injection step part is made to be equal or larger than a thickness of the electrolyte membrane member; and the resin material injected from the injection part is allowed to flow onto the lower step surface of the step part through the injection step part in the injection of the resin material into the resin flow passage.

According to a seventh aspect of the present invention, there is provided a polymer electrolyte fuel cell assembled by stacking a plurality of single cell modules each comprising an electrode-membrane-frame assembly which is formed of a membrane electrode assembly constituted by binding an anode electrode to one surface of a polymer electrolyte membrane member and binding a cathode electrode to the other surface of the electrolyte membrane member and a frame which contains a gas supply section that supplies fuel gas and oxidizer gas to the anode electrode and the cathode electrode respectively and which sandwiches the periphery of the membrane electrode assembly to hold the membrane electrode assembly; and a pair of separators which sandwich the electrode-membrane-frame assembly from the anode side and cathode side, wherein:

the frame of the electrode-membrane-frame assembly is formed integrally with a first frame member and a second frame member which sandwiches the edge of the electrolyte membrane member between the second frame member and the first frame member to hold the edge of the electrolyte membrane member; and a through-hole for pressing and fixing a part of the edge of the electrolyte membrane member arranged on the first frame member against the first frame member, when the second frame member is formed by injection molding, is formed on the second frame member.

EFFECT OF THE INVENTION

According to the present invention, a first frame member and an electrolyte membrane member are arranged in a first mold such that the periphery of the electrolyte membrane member is arranged on the first frame member formed in advance, a second metal mold is arranged for the first metal mold to form a resin flow passage for forming the second frame member which is in contact with the first frame member by interposing the electrolyte membrane member and a molding resin material is injected into the resin flow passage in the situation where a part of the edge of the electrolyte membrane member is pressed and fixed to the first frame member by a presser member mounted on the second mold to form the second frame member in the condition where it is bound integrally with the first frame member. For this reason, a high-temperature and high-pressure resin material is flowed into the resin flow passage in injection molding to surely prevent the occurrence of the phenomenon that the edge of the electrolyte membrane member is separated from the first frame member and floated. Therefore, the bind property between the polymer electrolyte membrane member of the membrane electrode assembly and the frame is enhanced, ensuring that the polymer electrolyte membrane member can be supported without fail. It is therefore possible to provide a manufacturing method for an electrode-membrane-frame assembly which can suppress the occurrence of the cross leak phenomenon to improve the performance of the polymer electrolyte fuel cell, and to provide a polymer electrolyte fuel cell.

BRIEF DESCRIPTION OF THE DRAWINGS

These aspects and features of the present invention will become clear from the following description taken in conjunction with the preferred embodiments thereof with reference to the accompanying drawings, in which:

FIG. 5A is a schematic view showing the procedures for forming the MEA-frame assembly of the first embodiment by injection molding.

FIG. 5C is a schematic view showing the procedures for forming the MEA-frame assembly of the first embodiment by injection molding.

FIG. 5D is a schematic view showing the procedures for forming the MEA-frame assembly of the first embodiment by injection molding.

DETAILED DESCRIPTION OF THE INVENTION

Figure 1:
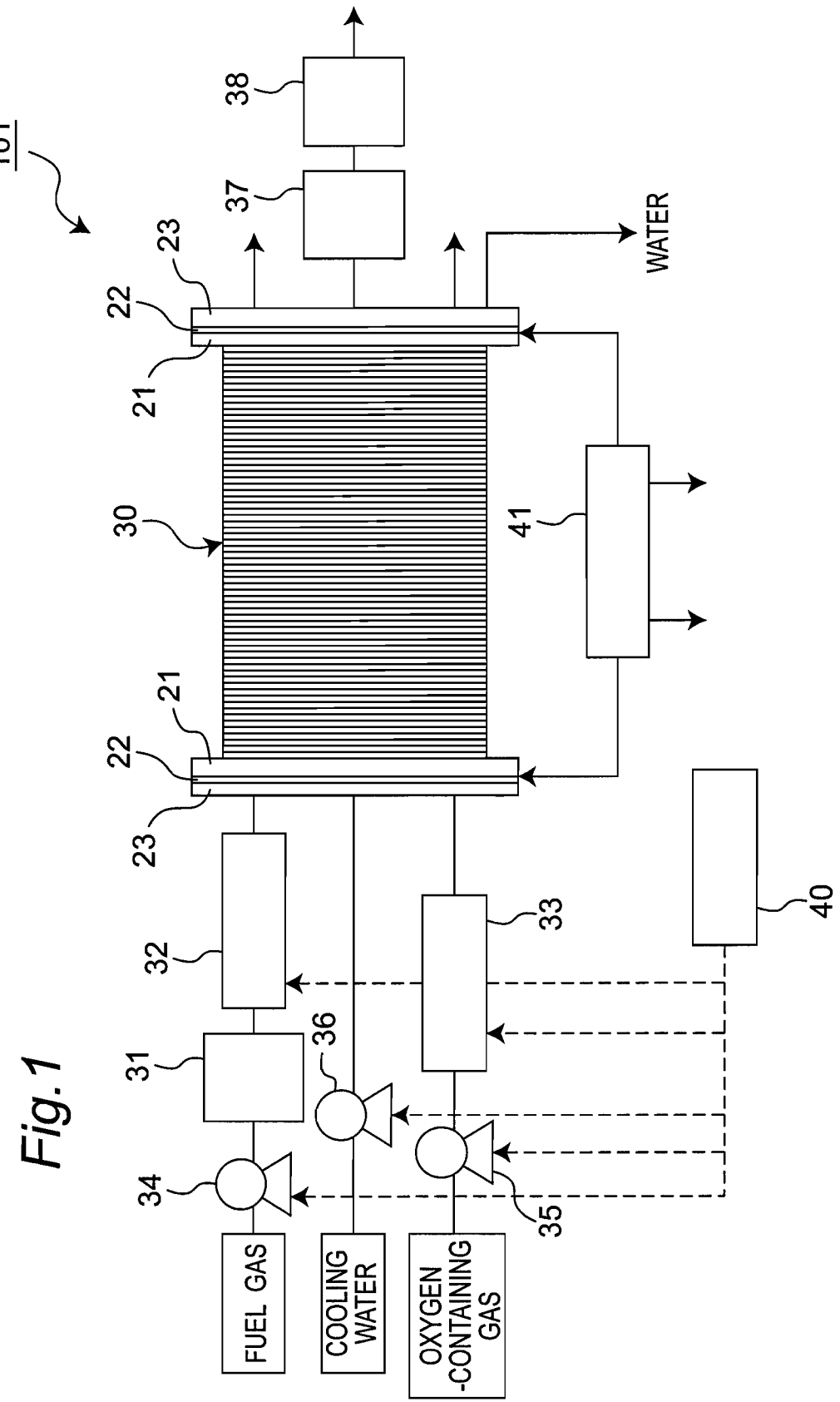
FIG. 1 is a schematic structural view showing the schematic structure of a fuel cell provided with a fuel cell stack according to a first embodiment of the present invention.

Before the description of the present invention proceeds, it is to be noted that like parts are designated by like reference numerals throughout the accompanying drawings.

Hereinbelow, an embodiment of the present invention will be described in detail with reference to the accompanying drawings.

First Embodiment

A schematic structural view showing the schematic structure of a fuel cell provided with a fuel cell stack according to a first embodiment of the present invention is shown in FIG. 1. Further, a schematic exploded view of the fuel cell stack (hereinafter referred to as "stack") with which a fuel cell 101 shown in FIG. 1 is provided is shown in FIG. 2.

The fuel cell 101 is, for example, a solid polymer electrolyte fuel cell (PEFC) that generates power, heat and water at the same time by electrochemically reacting fuel gas containing hydrogen with oxidizer gas containing oxygen such as air. As shown in FIG. 1, the fuel cell 101 is provided with a stack 30 having a stacked structure in which a plurality of fuel cells (or single cells) provided with a pair of anode and cathode are connected in series, a fuel treating unit 31 which extracts hydrogen from fuel gas, an anode humidifier 32 which humidifies the fuel gas containing hydrogen extracted in the fuel treating unit 31 to thereby improve power generation efficiency, a cathode humidifier 33 which humidifies oxygen-containing gas (oxidizer gas) and pumps 34 and 35 that supply the fuel gas and the oxygen-containing gas respectively. Specifically, the fuel treating unit 31, the anode humidifier 32 and the pump 34 constitutes a fuel supply unit that supplies the fuel gas to each cell of the gas stack 30. Further, the cathode humidifier 33 and the pump 35 constitute an oxidizer supply unit that supplies the oxidizer gas to each cell of the stack 30. Here, as such a fuel supply unit and oxidizer supply unit, other various structures may be adopted insofar as they have the ability to supply the fuel and oxidizer. In this first embodiment, any supply unit can obtain the effect of the first embodiment which will be described later as long as it is a supply unit that supplies the fuel and oxidizer to a plurality of cells with which the stack 30 is provided in common.

Further, the fuel cell 101 is provided with a pump 36 that supplies cooling water to be circulated for efficiently removing the heat generated in the stack 30 when power is generated, a heat exchanger 37 that exchanges the heat removed by this cooling water (for example, a liquid having no electroconductivity such as pure water is used) with a fluid such as top water and a warm-water tank 38 that reserves the heat-exchanged top water. Furthermore, the fuel cell 101 is provided with an operation control device 40 that performs a control operation for power generation by correlating the operation with each structural section and a power output section 41 that draws the power generated by the stack 30.

Figure 2:
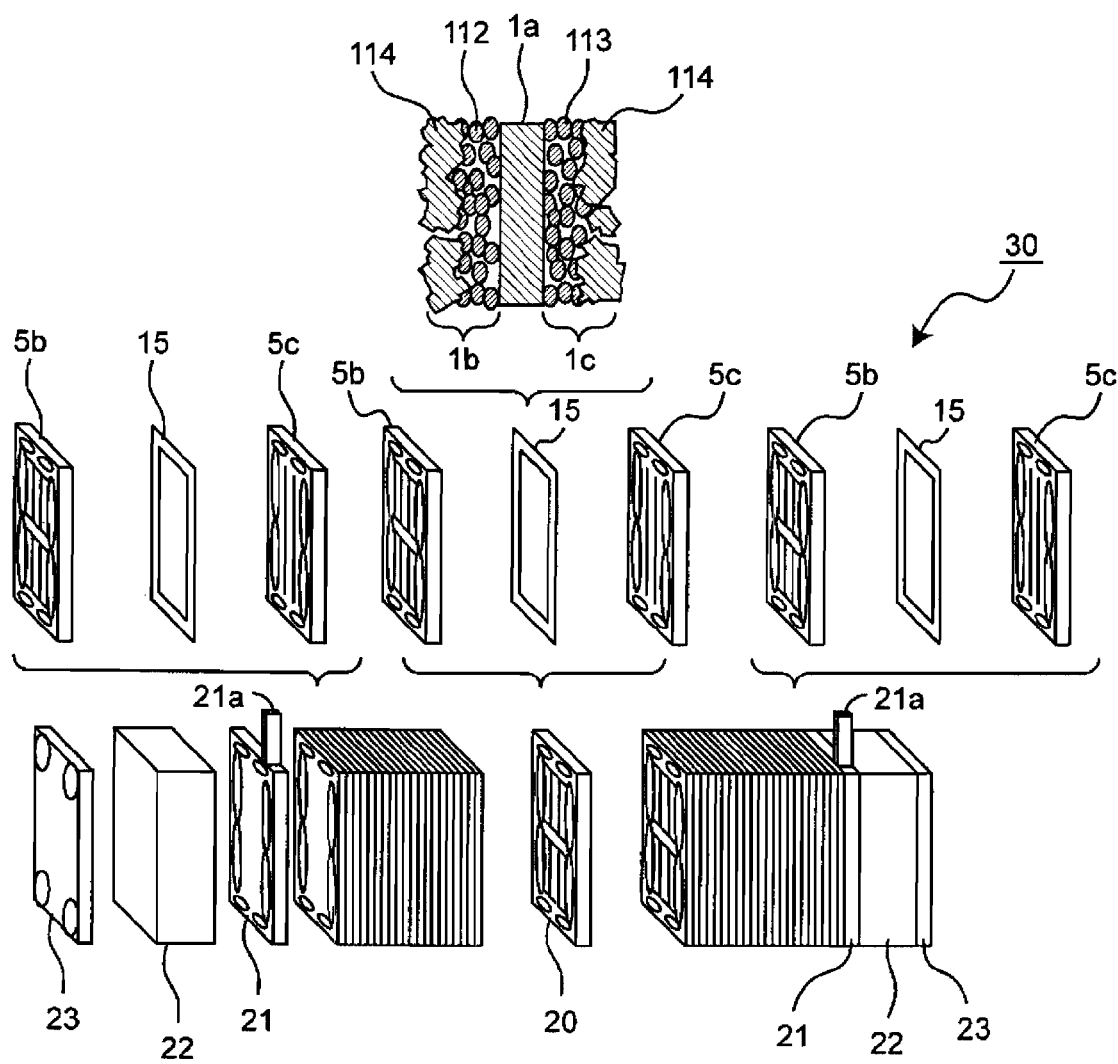
FIG. 2 is a schematic exploded view of the fuel cell stack with which the fuel cell shown in FIG. 1 is provided.

Further, as shown in FIG. 2, the stack 30 included in this fuel cell 101 is constituted by stacking a plurality of single cells (single cell module) 20 which are basic unit structures and by fastening the stacked cells with a current collecting plate 21, an insulating plate 22 and an end plate 23 from both sides under a prescribed load. Each of the current collecting plates 21 is provided with a current drawing terminal part 21a, from which current, that is, electricity is drawn when the power is generated. Each insulating plate 22 insulates the current collecting plate 21 from the end plate 23. Further, these insulating plates 22 may also be provided with introduction and discharge ports for gas and cooling-water, though not shown, depending on the case. Each end plate 23 fastens and supports the plurality of stacked single cells 20, the current collecting plate 21 and the insulating plate 22 under a prescribed load by a pressing means (though not shown).

As shown in FIG. 2, the single cell 20 is structured in such a manner that an electrode-membrane-frame assembly (hereinafter referred to as "MEA-frame assembly") 15 in which a MEA (membrane-electrode assembly) 1 is supported by a frame is sandwiched between a pair of separators 5b and 5c.

MEA 1 is structured by forming a catalyst layer (anode side catalyst layer) 112 containing, as its major component, a carbon powder carrying a platinum-ruthenium alloy catalyst on the anode surface side of a polymer electrolyte membrane 1a being an example of a polymer electrolyte membrane member that selectively transfers hydrogen ions and a catalyst layer (cathode side catalyst layer) 113 containing, as its major component, a carbon powder carrying a platinum catalyst on the cathode surface side and by arranging a gas diffusion layer 114 having both fuel gas or oxidizer gas permeability and electron conductivity on the outside surfaces of these catalyst layers 112 and 113. As the polymer electrolyte membrane 1a, a solid polymer material exhibiting proton conductivity, for example, a perfluorosulfonic acid membrane (Nafion membrane, manufactured by Du Pont) is generally used. Here, hereinafter, the anode side catalyst layer 112 and the gas diffusion layer 114 are collectively called "anode electrode 1b" and the cathode side catalyst layer 113 and the gas diffusion layer 114 are collectively called "cathode electrode 1c".

Each of the separators 5b and 5c may be made of a gas-impermeable electroconductive material and for example, those obtained by cutting a carbon material impregnated with a resin into a specified shape or those obtained by molding mixtures of a carbon powder and a resin material are usually used. A concave groove is formed on the parts of the separators 5b and 5c which are in contact with the MEA 15. When this groove is brought into contact with the gas diffusion layer 114, a gas flow passage is formed which serves to supply fuel gas or oxidizer gas to the electrode surfaces of the anode electrode 1b and the cathode electrode 1c and to convey excess gas. As the base material of the gas diffusion layer 114, a material formed of carbon fibers is usually used. As such a base material, for example, a carbon fiber woven fabric is used.

Figure 3:
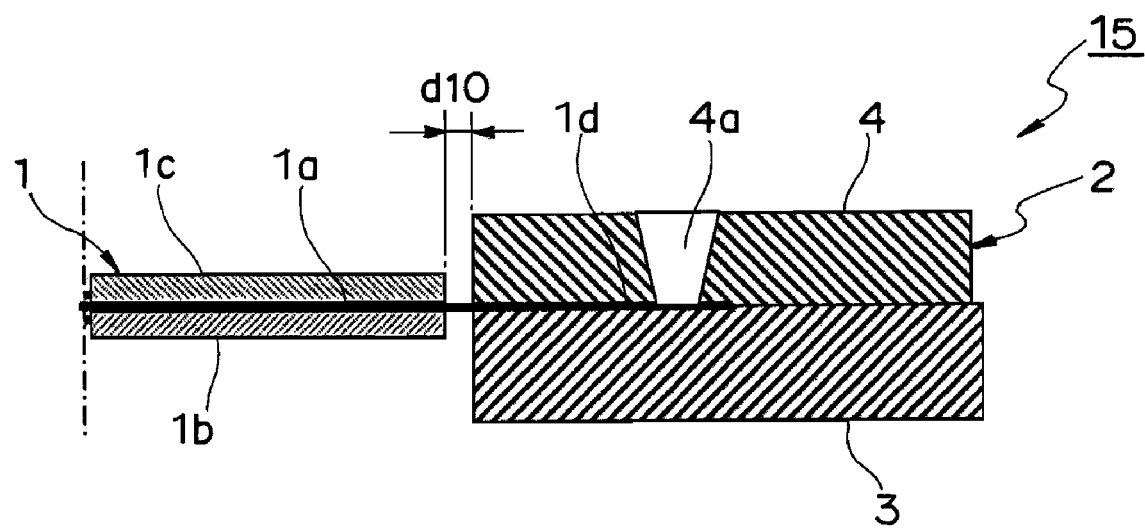
FIG. 3 is a schematic partial sectional view of a MEA with which a single cell of the fuel cell stack of the first embodiment is provided.

Here, an enlarged schematic partial sectional view in the vicinity of the end part of the MEA-frame assembly 15 of such a single cell 20 is shown in FIG. 3.

The single cell (single cell module) 20 is provided with the MEA-frame assembly 15 and the pair of separators 5b and 5c that sandwich the MEA-frame assembly 15 from the anode side and the cathode side. The MEA-frame assembly 15 is constituted of a MEA 1 formed by binding the anode electrode 1b to one surface of the polymer electrolyte membrane 1a and binding the cathode electrode 1c to the other surface of the electrolyte membrane 1a, and a frame 2 which is provided with gas supply sections (not shown) for supplying fuel gas and oxidizer gas to the anode electrode 1b and cathode electrode 1c respectively and supports the MEA 1 by sandwiching the peripheral part of this MEA 1. Then, a plurality of these single cells 20 are stacked to make an assembly, thereby forming a polymer electrolyte fuel cell.

As shown in FIG. 3, the frame 2 is formed by binding integrally a first frame member 3 having a horizontally frame shape with a second frame member 4 having the same frame shape by injection molding. Further, in MEA 1, the anode electrode 1b and the cathode electrode 1c are formed in a region inside of the periphery of the polymer electrolyte membrane 1a. Namely, MEA 1 is formed such that the edge of the polymer electrolyte membrane 1a is exposed. Moreover, the periphery 1d of the polymer electrolyte membrane 1a of the MEA 1 is closely bound with and supported by the first frame member 3 and the second frame member 4 in the condition where it is sandwiched between both frame members. Further, as shown in FIG. 3, a clearance d10 spaced to the extent that the inner periphery of the frame 2 and the outer peripheries of the cathode electrode 1b and the anode electrode 1c are not in contact with each other is formed over the entire periphery of the frame 2 between the frame and both electrodes.

Moreover, as shown in FIG. 3, a plurality of through-holes 4a are formed on the second frame member 4. A part of the periphery 1d of the electrolyte membrane 1a arranged on the first frame member 3 is put into a state that it is exposed through these through-holes 4a. Such through-hole 4a formed on the second frame member 4 is a through-hole formed by forming the second frame member 4 by injection molding in the situation where the periphery 1d of the electrolyte membrane 1a is arranged on the upper surface of the first frame member 3 formed in advance and in the situation where a part of the periphery 1d is pressed to fix it to the first frame member 3.

Figure 4:
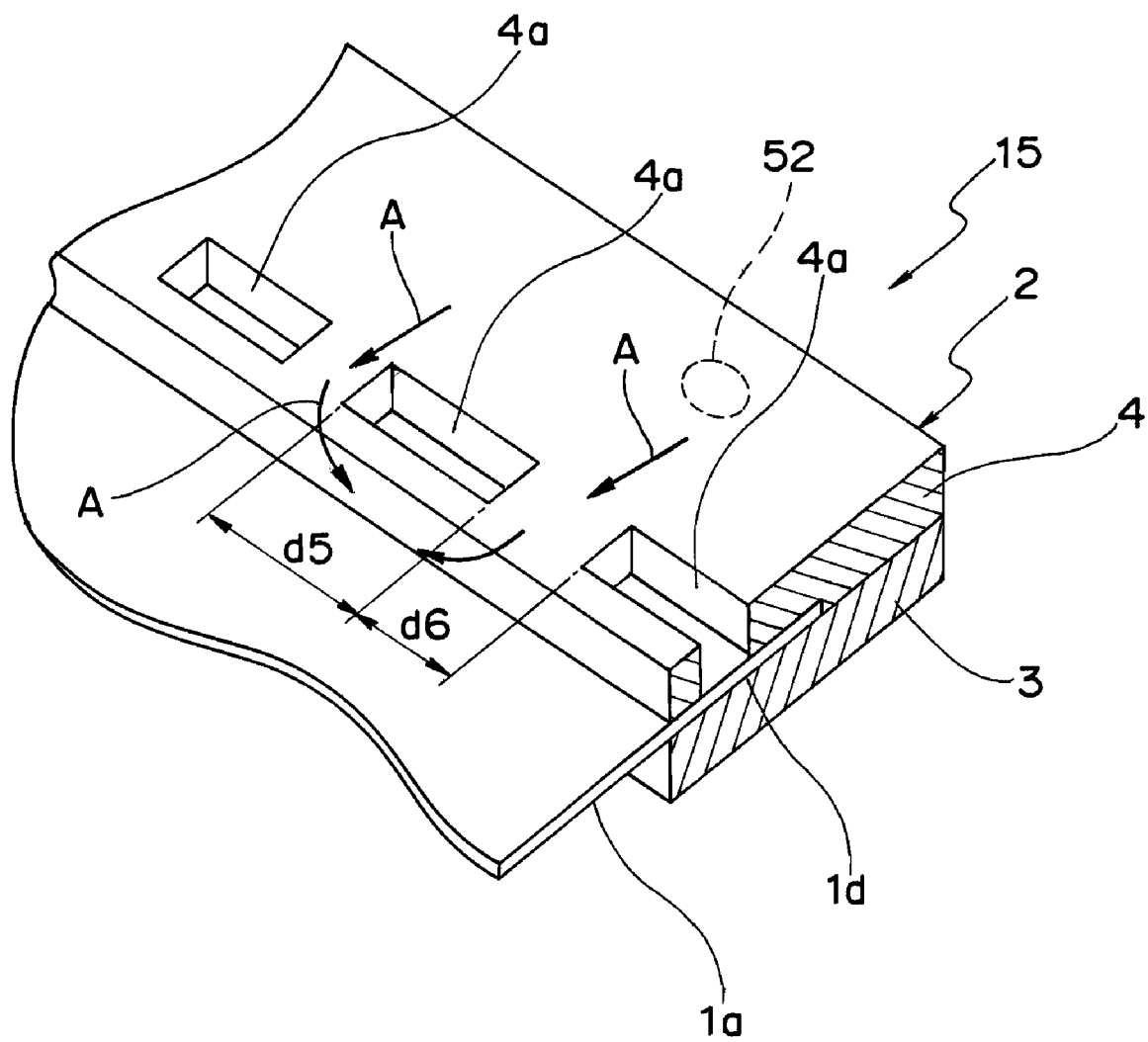
FIG. 4 is a schematic partial perspective view of a MEA-frame assembly shown in FIG. 3.

FIG. 4 shows a schematic perspective view in the vicinity of the end part of the MEA-frame assembly 15. As shown in FIG. 4, the through-hole 4a formed on the second frame member 4 has, for example, a rectangular plane shape, and a plurality of through-holes 4a are formed at a prescribed pitch along the inner periphery of the second frame member 4.

The frame 2, that is, the first frame member 3 and the second frame member 4 are formed of, for example, a resin material for injection molding. Specific examples of the material include R-250G or R-350G manufactured by Prime Polymer Co., Ltd. Specific examples of the material of the separator include a resin-impregnated graphite plate (glassy carbon manufactured by Tokai Carbon Co., Ltd.) having an external dimension of 120 mm×120 mm and a thickness of 3.0 mm.

Next, a method for forming the MEA-frame assembly 15 having the above structures by injection molding will be described with reference to schematic explanatory views shown in FIGS. 5A to 5F.

First, as shown in FIG. 5A, an upper mold 50 and a lower mold 60 are prepared in which the MEA 1 and the first frame member 3 are arranged. In the lower mold 60, the first frame member 3 is arranged on its upper surface, and a frame member receiving surface 61 which is a concavity and convexity part is formed such that the MEA 1 which is in a state of being arranged on the upper surface of the first frame member 3 is arranged. Moreover, the lower mold 60 is provided with a bar-like raising member 62 which separates the MEA-frame assembly 15 together with the molded resin from the frame member receiving surface 61. The upper mold 50 covers the upper surface of the first frame member 3 and the MEA 1 at the lower surface, and a flow passage formation surface 51 is formed on the upper mold 50 which is a concavity and convexity part for forming a prescribed flow passage between itself and the upper surface of the first frame member 3. Moreover, a plurality of gates 52 which are resin injection ports are formed on this flow passage formation surface 51 and each gate 52 is communicated with a resin introduction section 53 which is a concave part formed on the upper surface of the upper mold 50. Further, the upper mold 50 is provided with a clamping member 54 that clamps the upper mold 50 and the lower mold 60 in the condition where the both molds are positioned.

Figure 5B:
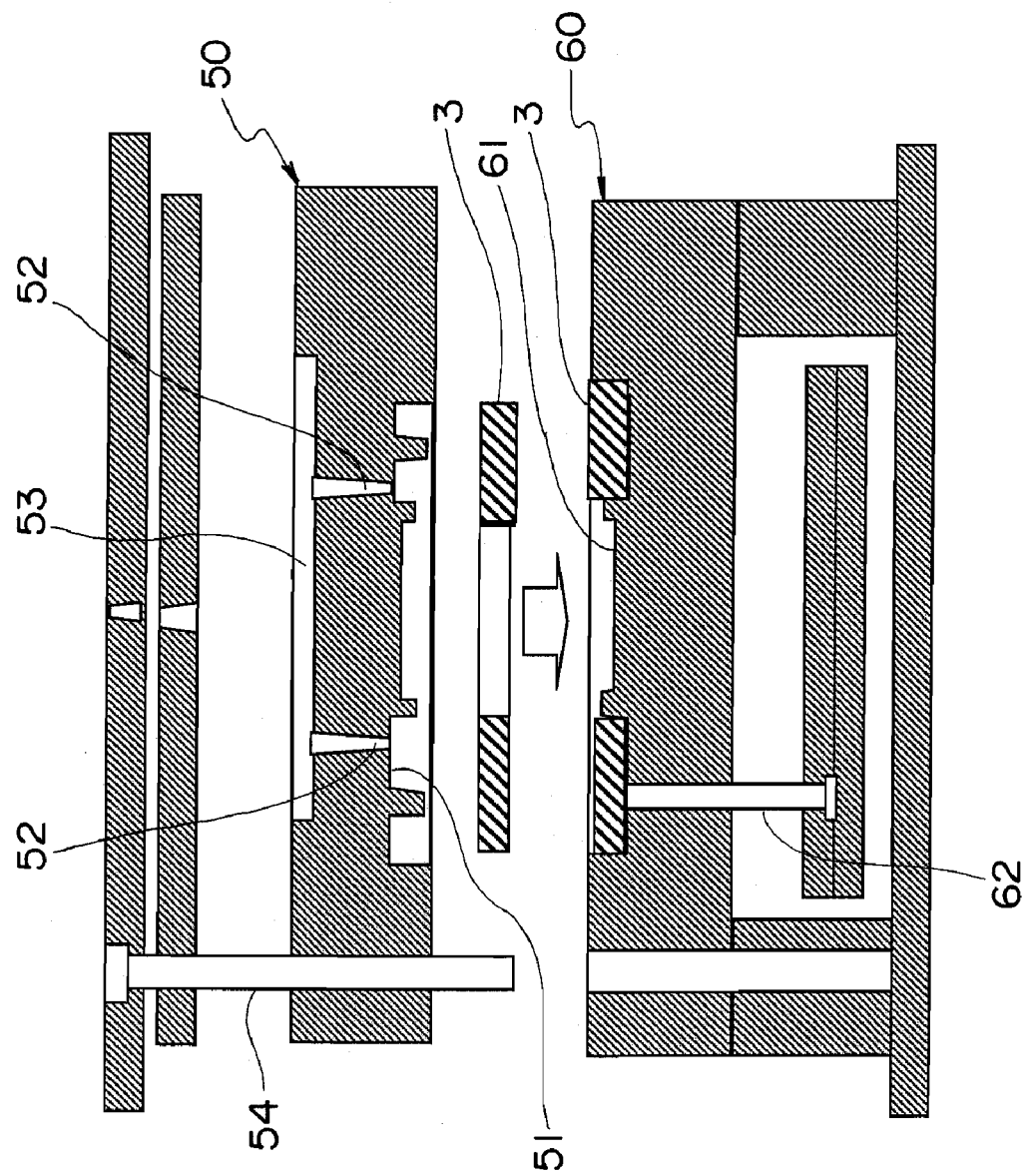
FIG. 5B is a schematic view showing the procedures for forming the MEA-frame assembly of the first embodiment by injection molding.

Next, as shown in FIG. 5B, the first frame member 3 formed in advance by injection molding or the like is mounted on the frame member receiving surface 61 of the lower mold 60. After that, as shown in FIG. 5C, the MEA 1 is positioned and mounted such that the periphery 1d of the electrolyte membrane 1a is arranged on the upper surface of the first frame member 3 put in the condition where it is mounted on the frame member receiving surface 61. Thereafter, as shown in FIG. 5D, the upper mold 50 is clamped by the clamping member 54 to the lower mold 60 mounted with the first frame member 3 and the MEA 1. In the situation where such clamp was carried out, a flow passage in which a resin is allowed to flow and to be filled is formed between the upper surface of the first frame member 3 and the flow passage formation surfaces 51.

Figure 18:
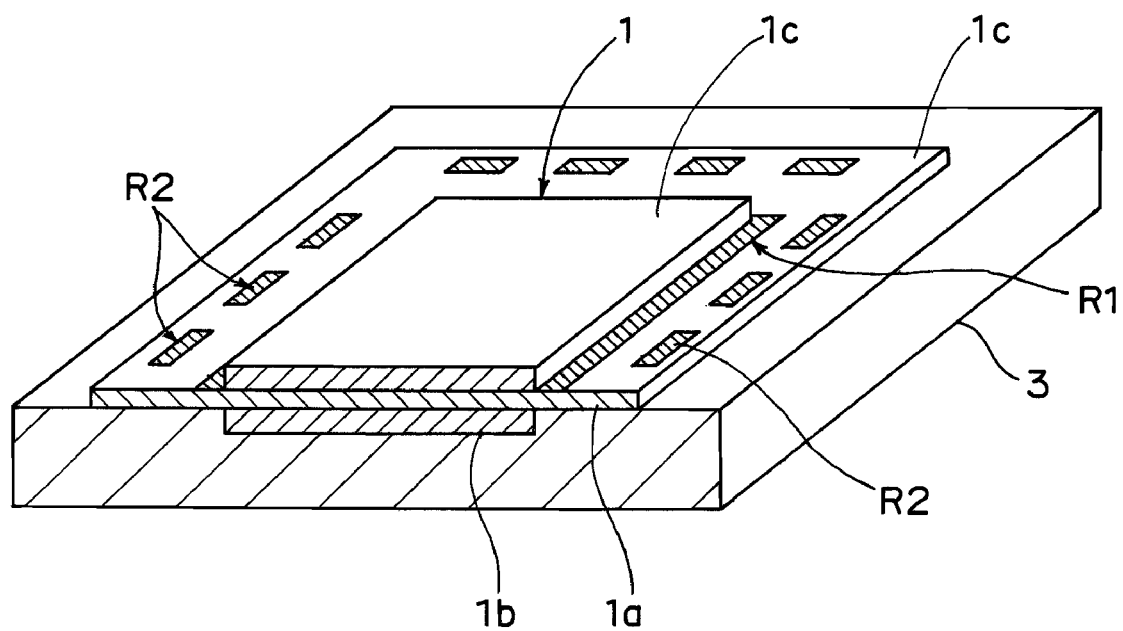
FIG. 18 is a schematic view showing a position where a MEA is supported in the production (clamping of a mold) of a MEA-frame assembly in a first embodiment.

Specifically, a resin flow passage 55 which is in contact with the upper surface of the first frame member 3 by interposing the periphery 1d of the electrolyte membrane 1a is formed between the flow passage formation surface 51 of the upper mold 50 and the first frame member 3. Moreover, on the flow passage formation surface 51 of the upper mold 50, a plurality of presser members 56 are formed each of which has a convex form projected towards the upper surface of the first frame member 3 and presses a part of the periphery 1d of the electrolyte membrane 1a in the condition where it is arranged on the upper surface of the first frame member 3, to the first frame member 3 at its distal end (lower end in the figure) in this resin flow passage 55. In the situation where the molds are clamped in this manner, the resin flow passage 55 is formed, and in the resin flow passage 55, a part of the periphery 1d of the electrolyte membrane 1a is pressed by each presser member 56 and is fixed to the upper surface of the first frame member 3. Here, though not shown, each presser member 56 is formed so as to be arranged at a specified pitch in a horizontally frame-like arrangement along the first frame member 3. Further, as shown in FIG. 5D, the area adjacent to and along the outer peripheries of the anode electrode 1b and the cathode electrode 1c is put into the condition that it is sandwiched between the upper mold 50 and the lower mold 60 to be supported. Here, the position (region) where MEA 1 is supported by the mold and the like will be described with reference to FIG. 18 showing a schematic perspective view (showing a section partly) of MEA 1 and the first frame member 3. In the situation where the upper mold 50 and the lower mold 60 are clamped, as shown in FIG. 18, the periphery 1d of the electrolyte membrane 1a is put into the condition that it is supported by the upper mold 50 and the lower mold 60 at a first position R1 which is an area adjacent along the outer peripheral end of the anode electrode 1b and cathode electrode 1c and at the same time, it is pressed and supported by a plurality of presser members 56 at second positions R2 which are a plurality of areas on the outside of the first position R1. Here, in such a supported state, the molds 50 and 60 are respectively formed so as to prevent the anode electrode 1b and the cathode electrode 1c of MEA 1 from being crushed and damaged by each of the molds 50 and 60.

Figure 5E:
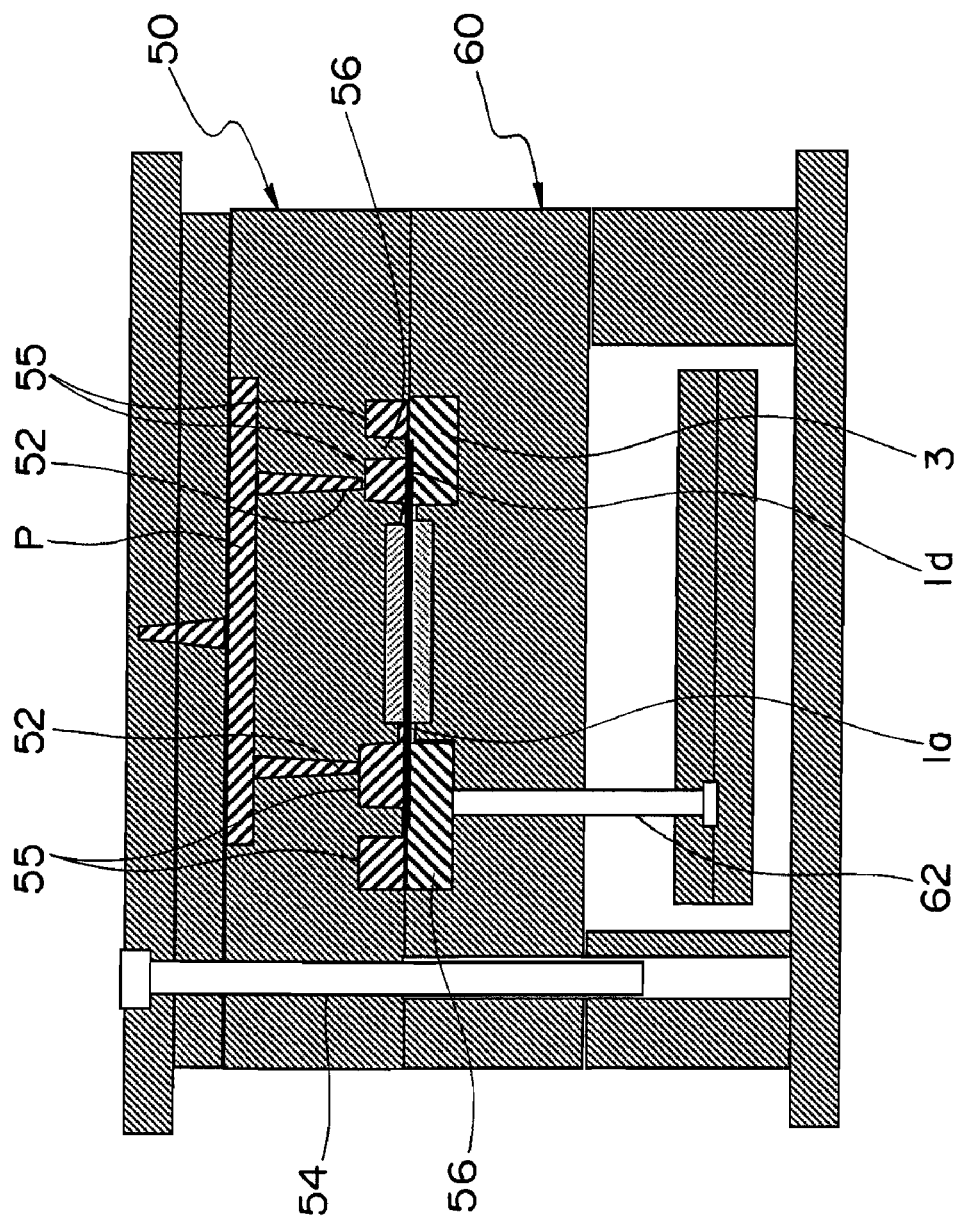
FIG. 5E is a schematic view showing the procedures for forming the MEA-frame assembly of the first embodiment by injection molding.

Next, as shown in FIG. 5E, the resin material P is ejected and injected into the mold. Specifically, the resin P injected into the resin introduction section 53 of the upper mold 50 is injected into the resin flow passage 55 formed on the upper mold 50 side through each gate 52 and filled in the resin flow passage 55. In this injection molding, the resin material P is injected into the resin flow passage 55 in high-temperature and high-pressure condition, however, since a part of the periphery 1d of the electrolyte membrane 1a in the resin flow passage 55 is put into the condition that it is sandwiched between the upper mold 50 and the lower mold 60 to be supported and at the same time, pressed and fixed by each presser member 56, the occurrence that the periphery 1d of the electrolyte membrane 1a is separated from the upper surface of the first frame member 3 and floated can be prevented reliably.

Figure 5F:
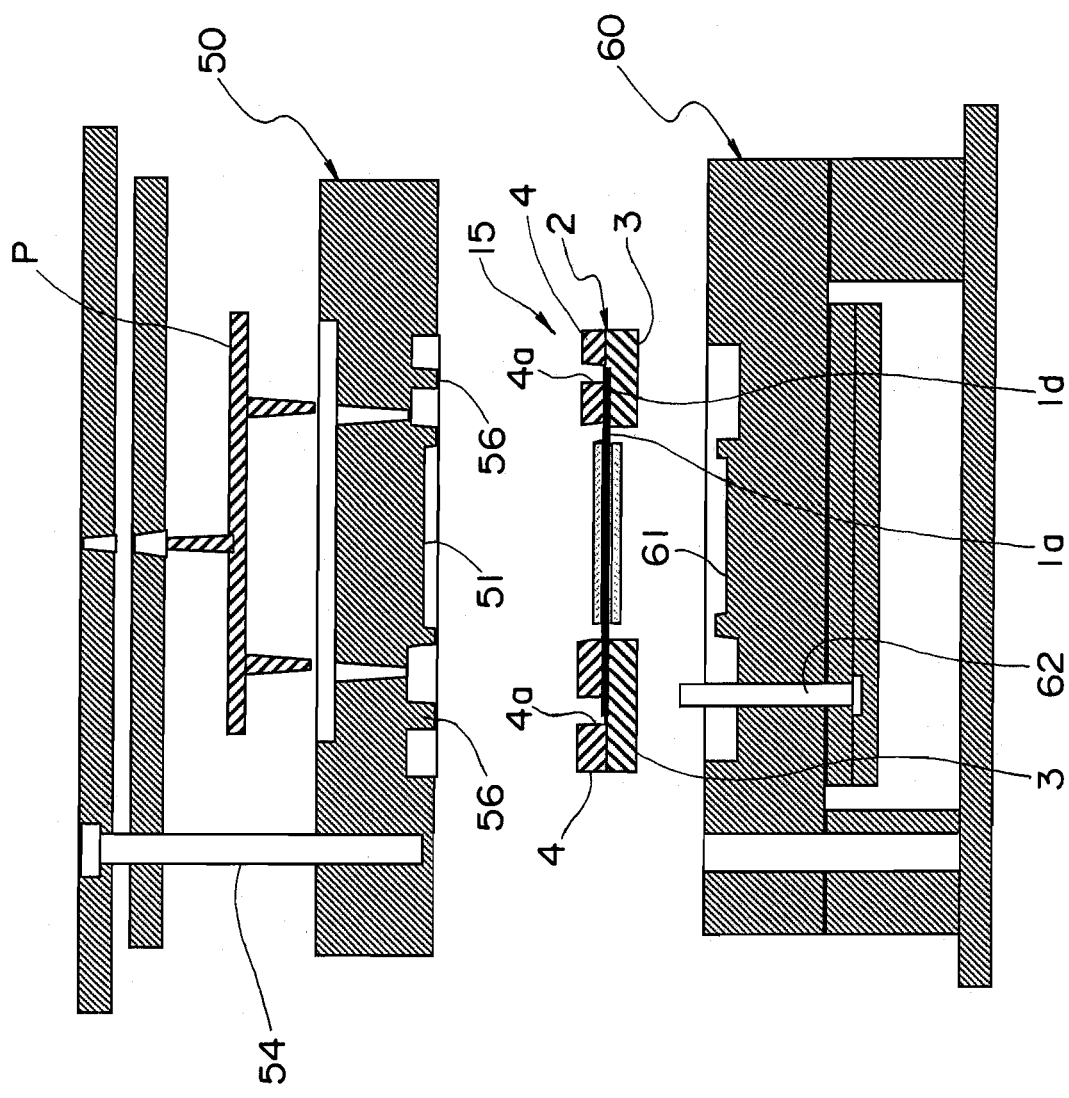
FIG. 5F is a schematic view showing the procedures for forming the MEA-frame assembly of the first embodiment by injection molding.

When the filling of the resin material P in the resin flow passage 55 is completed, the resin is cured. After that, as shown in FIG. 5F, the clamping of the upper mold 50 and the lower mold 60 is released and the MEA-frame assembly 15 in which the second frame member 4 is formed at a position corresponding to the resin flow passage is released from the frame member receiving surface 61 of the lower mold 60 by the raising member 62. Here, the injection molding is completed.

The injection molding results in the formation of the MEA-frame assembly 15 put into the condition that the periphery 1d of the electrolyte membrane 1a is arranged on the upper surface of the first frame member 3 and is sandwiched between the first frame member 3 and the second frame member 4 as shown in FIGS. 3 and 4. Further, through-holes 4a penetrating up to the surface of the electrolyte membrane 1a are formed on the second frame member 4 as traces of the presser members 56. Further, the second frame member 4 is formed by injection molding, and therefore it can be formed in the condition where it is bound integrally with the first frame member 3 by interposing the periphery 1d of the electrolyte membrane 1a. Therefore, in the frame 2, the electrolyte membrane 1a can be held surely and stably at a position almost in the center of the thickness direction of the frame 2, and can be held in the condition where it is closely bound without any space by injection molding. This can efficiently suppress the cross leak phenomenon to thereby enhance power generation efficiency in the fuel cell.

Here, as to the positional relation between the gate 52 which is the resin injection opening of the upper mold 50 and the presser member 56 (or the through-hole 4*a*) that presses the electrolyte membrane 1*a*, several structures which may be adopted in this first embodiment will be described.

Figure 6:
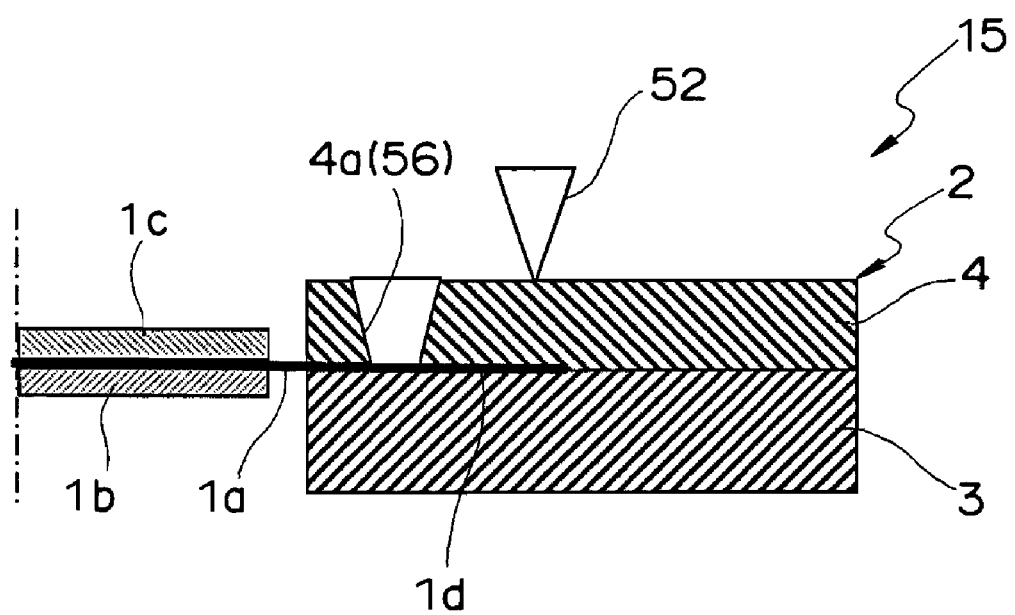
FIG. 6 is a schematic partial sectional view of a MEA-frame assembly according to an example of a modification of the first embodiment.

First, in the second frame member 4, as shown in a schematic sectional view of FIG. 6, the presser member 56 is arranged at the position inside of, for example, the gate 52 (position on the center side of the frame member) so as to evade the arrangement of the gate 52, in other words, it is preferable to form the through-hole 4*a*. Such arrangement of the presser member 56 ensures that as shown in FIG. 4, a resin material supplied through the gate 52 in a space on the outside of the array of each presser member 56 is flowed into a space inside of the array of the presser member 56 through a space between the presser members 56 (see the arrow A), making it possible to fill the resin. Accordingly, in the injection molding, the fluidity of the resin becomes better, enabling the second frame member 4 to be formed without uneven filling of the resin.

Figure 7:
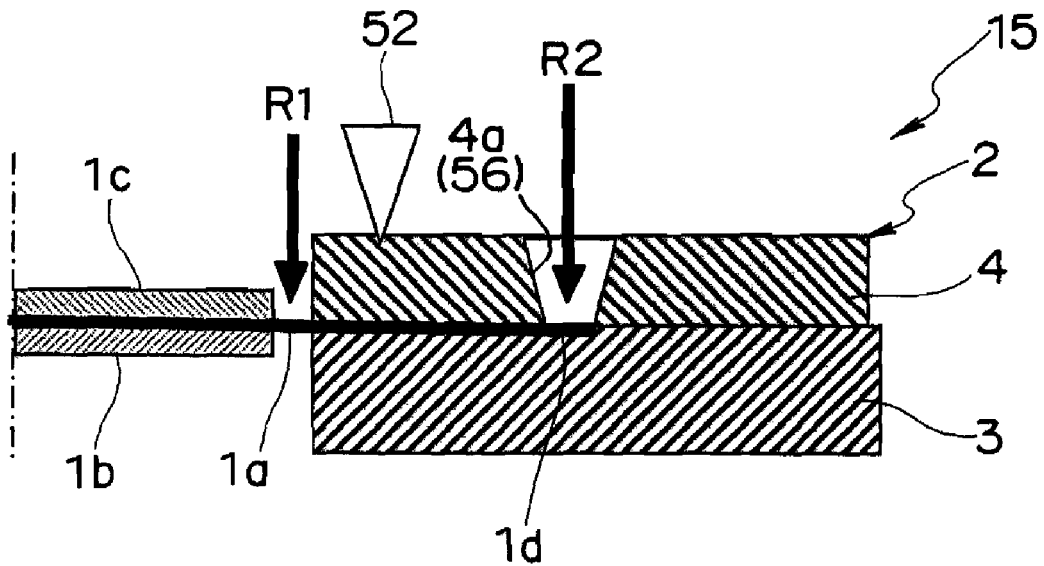
FIG. 7 is a schematic partial sectional view of a MEA-frame assembly according to an example of a modification of the first embodiment.

Further, as shown in FIG. 7, the case where the positions of the gate 52 and presser member 56 may be reversed. Specifically, an arrangement may be adopted such that the gate 52 may be positioned between the first position R1 which is a position for holding by the upper mold 50 and the lower mold 60 and the second positions R2 which are positions for holding by the presser members 56. By adopting the arrangement described above, a resin can be injected from the gate 52 in the situation where the periphery 1*d* of the electrolyte membrane 1*a* is surely held in the inside and outside thereof being in contact with the upper surface of the first frame member 3. Therefore, the filling characteristics of the resin at least between the first position R1 and the second positions R2 can be good, with the result that the occurrence of the cross leak phenomenon can be reduced efficiently.

Figure 8:
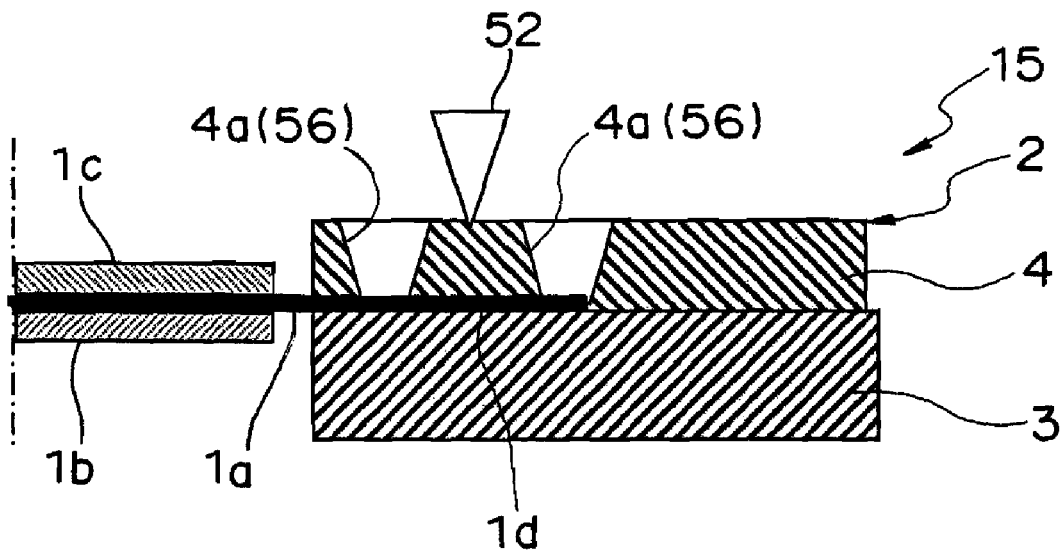
FIG. 8 is a schematic partial sectional view of a MEA-frame assembly according to an example of a modification of the first embodiment.

Further, as shown by the schematic sectional view of FIG. 8, it is also preferable to arrange a presser member 56 at each position inside and outside of the gate 52 so as to evade the position of the gate 52 in the second frame member 4. Because higher pressure is applied to the injected resin material P in the vicinity of the gate 52, the resin material P is put into a higher temperature and higher pressure state, and the fluidity of the resin is enhanced. Therefore, the electrolyte membrane 1*a* is surely pressed by the presser members 56 at each of inside and outside positions, whereby the electrolyte membrane 1*a* can be exactly prevented from floating or the like.

Further, specific examples of the dimensions in the structure in which the electrolyte membrane 1*a* is pressed by the presser member 56 will be described with reference to FIGS. 9A, 9B and 9C.

Figure 9A:
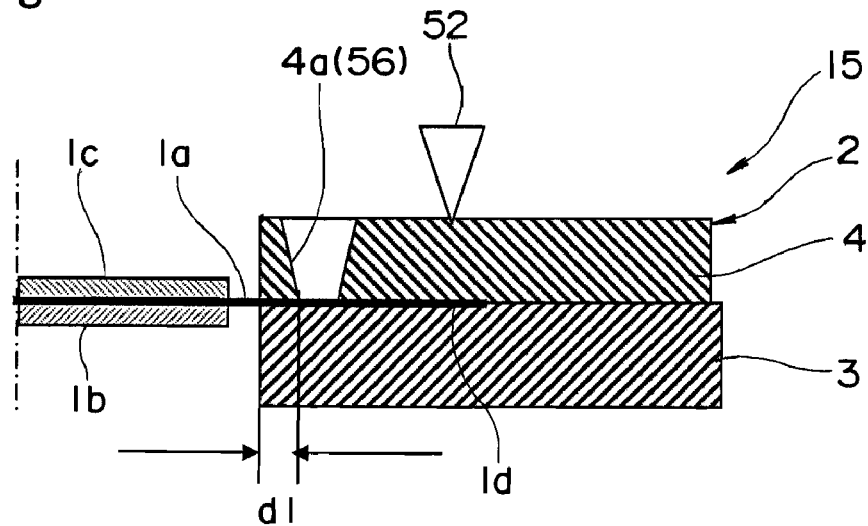
FIG. 9A is a schematic explanatory view of an example of the dimension of a through-hole in a MEA-frame assembly according to the first embodiment.

First, an example of the dimension in the structure in which the presser member 56 (through-hole 4*a*) is arranged at a position inside of the gate 52 is shown in FIG. 9A. As shown in FIG. 9A, the through-hole 4*a* is preferably formed at a place where the distance d1 from the inner periphery of the second frame member 4 is designed to be in a range from 0.3 mm to 2.5 mm. This reason is that when the distance d1 is less than the above range, the filling characteristics of the resin material in a space inside of the presser member 56 is deteriorated. Further, when the distance d1 exceeds this range, a useless area of the electrolyte membrane is increased, which is inefficient.

Figure 9B:
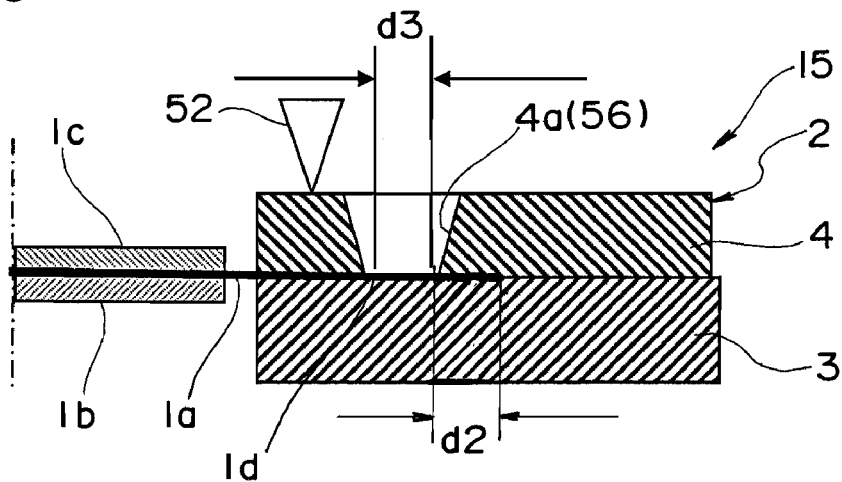
FIG. 9B is a schematic explanatory view of an example of the dimension of a through-hole in a MEA-frame assembly according to the first embodiment.
Figure 9C:
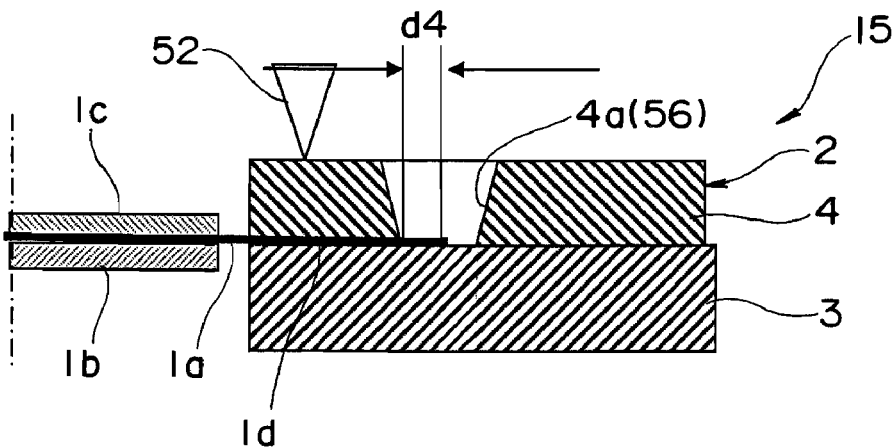
FIG. 9C is a schematic explanatory view of an example of the dimension of a through-hole in a MEA-frame assembly according to the first embodiment.

Next, an example of the dimension in the structure in which the presser member 56 is arranged at a position outside of the gate 52 is shown in FIG. 9B. As shown in FIG. 9B, the distance d2 between the end part of the electrolyte membrane 1*a* and the formation position of the through-hole 4*a* is preferably within 2.5 mm in order to suppress the floating of the end part of the membrane more efficiently. Further, the width of the through-hole 4*a*, that is, the width dimension d3 of the presser member 56 is preferably designed to be in a range from 0.3 mm to 2.5 mm. This reason that when the width dimension d3 is less than the above range, the strength of the presser member 56 (strength of the mold) itself is insufficient. Further, when the dimension d3 exceeds this range, a useless area of the electrolyte membrane 1*a* is increased, which is in effect.

Further, in the structure shown in FIG. 9B, the end part of the electrolyte membrane 1*a* may be positioned within the area of the through-hole 4*a*. In this case, the length dimension d4 of the end part of the electrolyte membrane 1*a* exposed to the inside of the through-hole 4*a* is preferably at least 0.3 mm or more. This is because when the dimension d4 is less than the above value, there may be occurred the case where the electrolyte membrane 1*a* cannot be pressed exactly, making it difficult to make practical control when displacement occurs.

Further, as shown in FIG. 4, the length dimension d5 of the through-hole 4*a* in the array direction is preferably designed to be in a range from 0.6 mm to 20 mm. When the dimension d5 is less than the above range, the strength of the presser member 56 is insufficient and there is the possibility of the presser member 56 being damaged in the injection molding. When the dimension d5 exceeds this range, there is the possibility that the flow of the resin into a space inside of the array part is inhibited. Furthermore, the pitch d6 of the array interval of each through-hole 4*a* is preferably designed to be in a range from 0.6 mm to 10 mm. When the pitch d6 is less than the above range, the filling characteristics of the resin in the inside space is deteriorated, whereas when the pitch d6 exceeds this range, there is the possibility of the electrolyte membrane 1*a* being floated within the space between through-holes.

Second Embodiment

Figure 10:
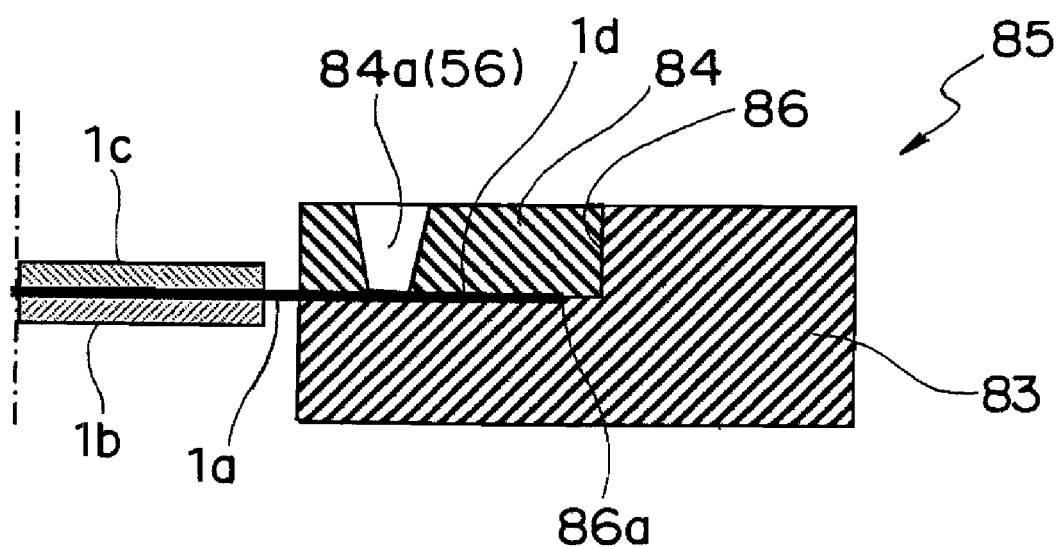
FIG. 10 is a schematic partial sectional view of a MEA-frame assembly according to a second embodiment of the present invention.

Here, the present invention is not limited to the above embodiment and may be practiced in various embodiments. For example, a schematic sectional view of a MEA-frame assembly 85 included in a fuel cell in a second embodiment according to the present invention is shown in FIG. 10. Here, in the following descriptions, the same structural members as those used in the above first embodiment are designated as the same reference numbers and the descriptions of these members are not given.

The MEA-frame-assembly 85, as shown in FIG. 10, has a structure in which a second frame member 84 is formed so as to fill this step part 86 by injection molding in the condition where the step part 86 is formed in a first frame member 83, and the periphery 1*d* of the electrolyte membrane 1*a* is arranged on a lower step surface 86*a* of this step 86 and pressed and fixed by the presser member 56 (through-hole 84*a*).

When adopting the structure of this second embodiment, the amount of a resin material to be used in the injection molding (secondary molding) of the second frame member can be reduced, and thermal influence on the first frame member 83 in the secondary injection molding can be more reduced, enabling the production of the MEA-frame assembly 85 with high preciseness.

Figure 11:
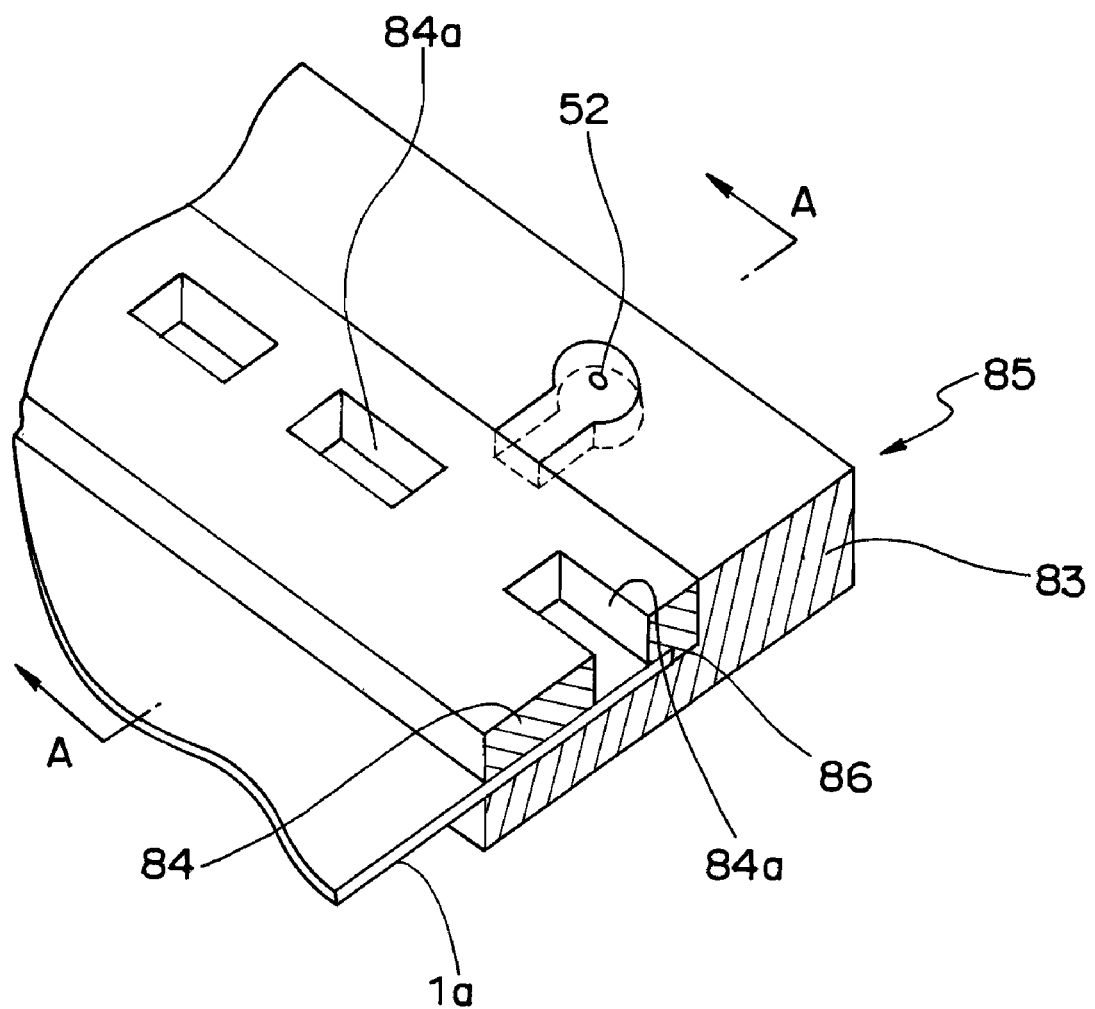
FIG. 11 is a schematic partial perspective view of a MEA-frame assembly according to the second embodiment.
Figure 12:
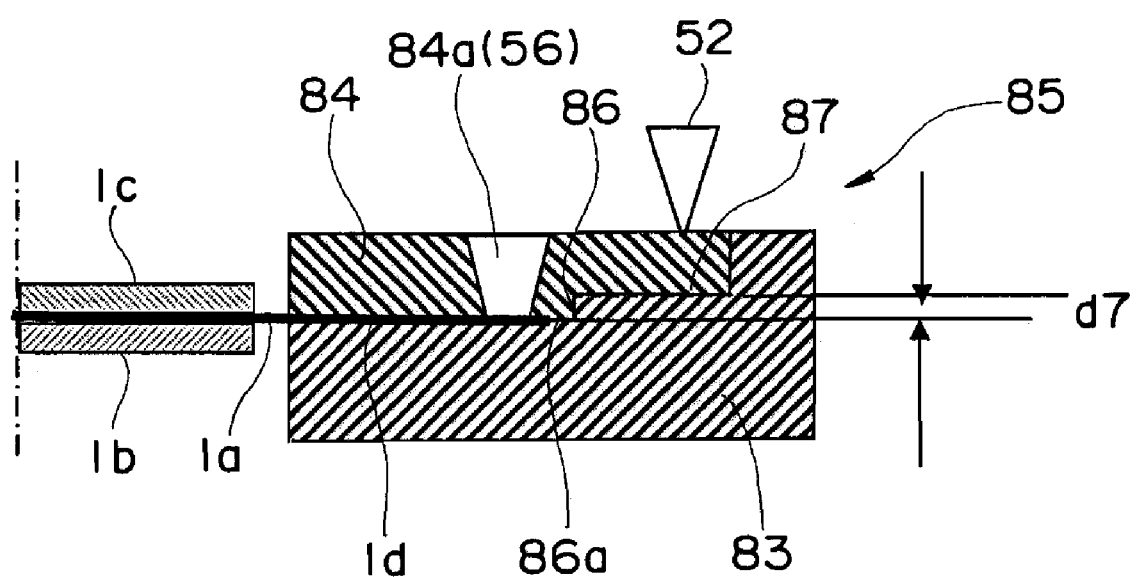
FIG. 12 is a sectional view along the line A-A in the MEA-frame assembly of FIG. 11.

Moreover, a schematic perspective view of the MEA-frame assembly 85 is shown in FIG. 11 and a sectional view along the line A-A in the vicinity of the position of the gate in the MEA-frame assembly 85 of FIG. 11 is shown in FIG. 12. As shown in FIGS. 11 and 12, a resin injection step part 87 is furthermore formed at the position where the gate 52 is formed in the step part 86 formed in the first frame member 83. The step dimension d7 between this resin injection step part 87 and the lower step surface 86a of the step part 86 is designed to be larger than, for example, the thickness of the electrolyte membrane 1a. By forming the resin injection step part 87 described above, the resin material injected from the gate 52 is first allowed to flow in the resin injection step part 87 and then, into the lower step surface 86a of the step part 86 on which the electrolyte membrane 1a is arranged. In this flow of the resin, the resin to be flown is allowed to easily flow on the surface of the electrolyte membrane 1a since the resin injection step part 87 is located at a position higher than the upper surface of the electrolyte membrane 1a arranged on the lower step surface 86a of the step part 86. Therefore, the floating of the end part of the electrolyte membrane 1a caused by the flow of the resin can be prevented more efficiently.

Figure 13:
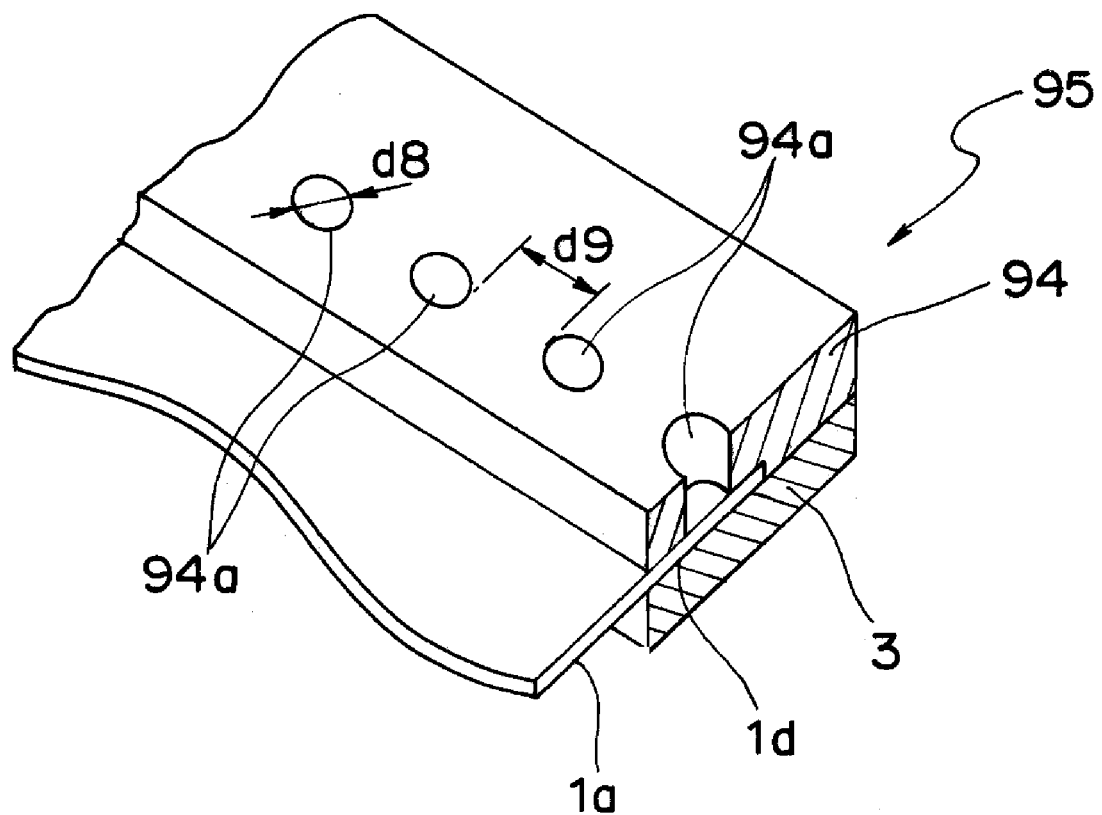
FIG. 13 is a schematic perspective view of a MEA-frame assembly of an example of a modification of an embodiment of the present invention.

In each of the above embodiments, the case where each through-hole 4a to be formed on the second frame member 4 or the like has a rectangular plane form is described. However, the present invention is not limited to such a case. The above case may be replaced with, for example, the case where, like the MEA-frame assembly 95 shown by the schematic perspective view of FIG. 13, a through-hole 94a having a circular plane form is formed in the second frame member 94.

In this case, the hole diameter d8 of the through-hole 94a is preferably designed to be in a range from 0.3 mm to 5 mm. This reason is that when the hole diameter d8 is less than the above range, the mold has insufficient strength or there is possibly the case where the formation as a through-hole is difficult, whereas when the hole diameter d8 exceeds the above range, the exposed area of the electrolyte membrane 1a, that is, the area of the region where the electrolyte membrane 1a is not supported by the frame member, is increased. Further, the pitch d9 of the array interval of the through-holes 94a is preferably designed to be in a range from 0.6 mm to 10 mm. This reason is that when the pitch d9 is less than the above range, it is difficult to fill the resin material in other through-holes, whereas when the pitch d9 exceeds the above range, the electrolyte membrane is easily floated within the space between through-holes.

Figure 14:
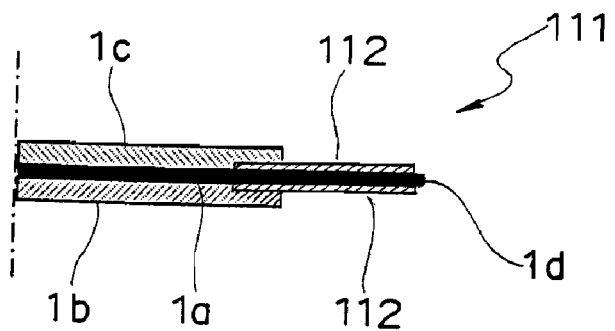
FIG. 14 is a schematic sectional view of a MEA according to an example of a modification of an embodiment of the present invention.
Figure 15:
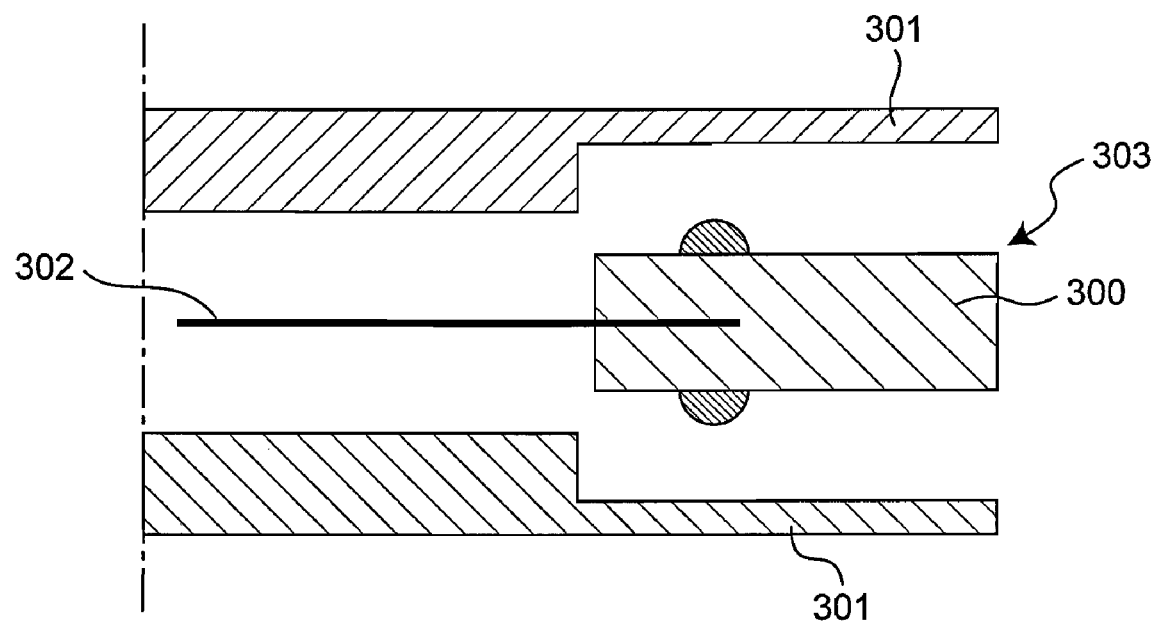
FIG. 15 is an exploded sectional view of an electrode-membrane-frame assembly and a separator of a conventional solid polymer electrolyte fuel cell.
Figure 16A:
FIG. 16A is a schematic explanatory view of a method for producing a MEA-frame assembly of a conventional solid polymer electrolyte fuel cell.
Figure 16B:
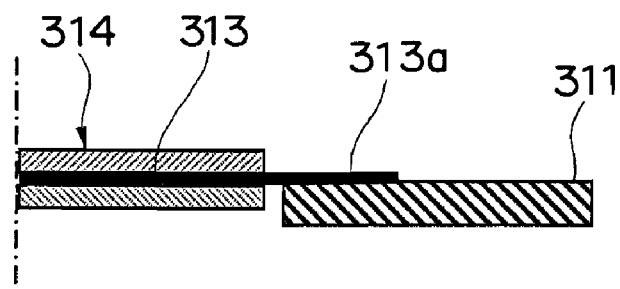
FIG. 16B is a schematic explanatory view of a method for producing a MEA-frame assembly of a conventional solid polymer electrolyte fuel cell.
Figure 16C:
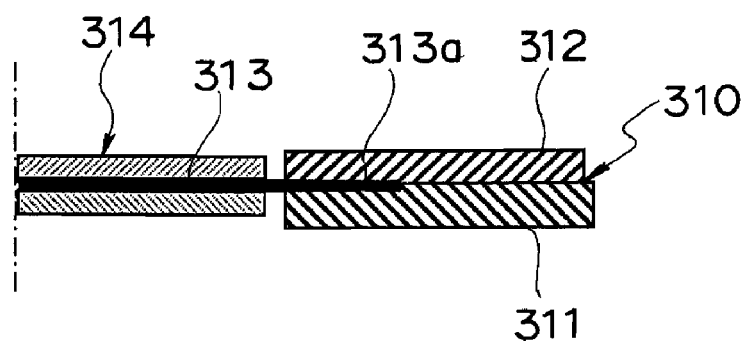
FIG. 16C is a schematic explanatory view of a method for producing a MEA-frame assembly of a conventional solid polymer electrolyte fuel cell.
Figure 17A:
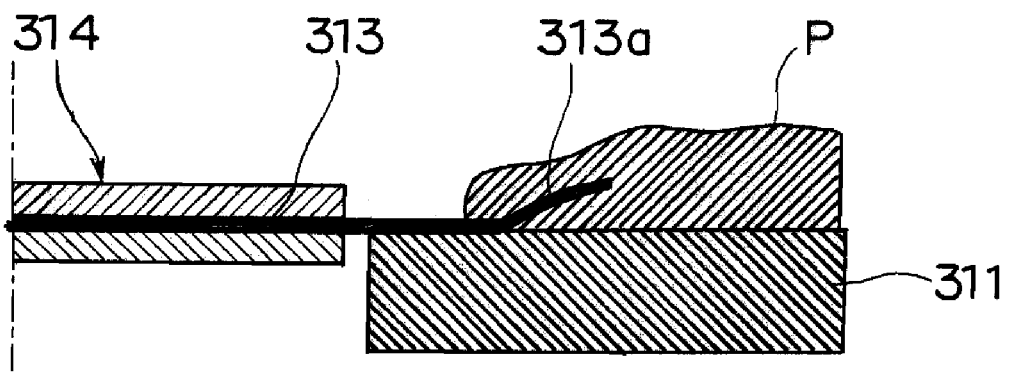
FIG. 17A is a schematic explanatory view of a membrane-floating phenomenon in a method for producing a conventional MEA-frame assembly.
Figure 17B:
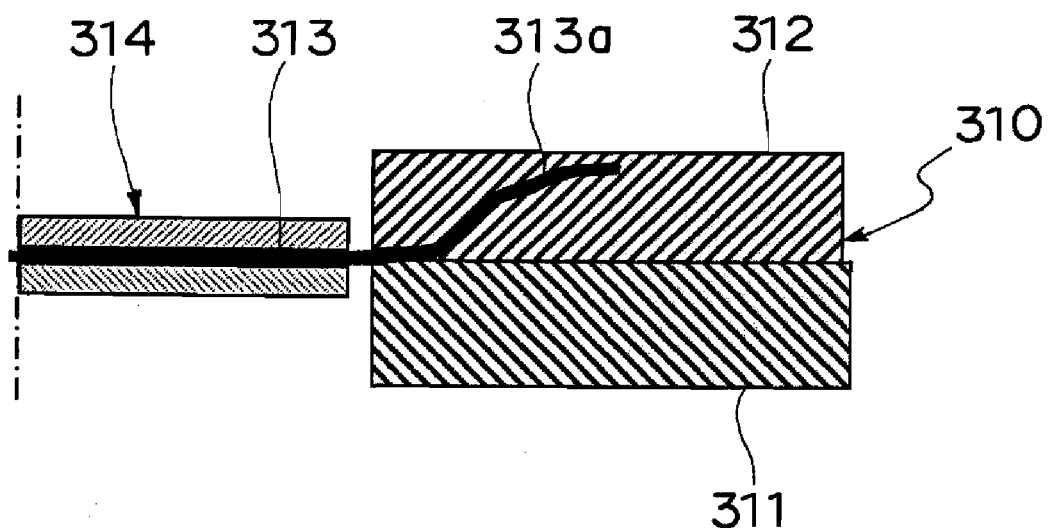
FIG. 17B is a schematic explanatory view of a membrane-floating phenomenon in a method for producing a conventional MEA-frame assembly.

Further, the present invention may also be the case where, as shown by a schematic sectional view of MEA 111 in FIG. 14, a reinforcing membrane 112 is formed on the periphery 1d of the electrolyte membrane 1a. This reinforcing membrane 112 has the ability to protect the electrolyte membrane 1a from a high-temperature and high-pressure resin in the injection molding. This reinforcing membrane 112 may be formed on one or both surfaces of the electrolyte membrane 1a. Here, in the present invention, the polymer electrolyte membrane member may also be the polymer electrolyte membrane itself, or includes those obtained by forming such a reinforcing membrane on the polymer electrolyte membrane.

Here, the case where the through-hole 4a formed on the second frame member 4 or the like is in an opened state is described. However, this case may be replaced with the case where the through-hole 4a is closed by filling the through-hole with a seal agent or the like after the second frame member remains formed. If the electrolyte membrane 1a is exposed in the through-hole 4a, there is the possibility of the occurrence of the cross leak phenomenon even though it is slight. Therefore, the occurrence of the cross leak phenomenon can be surely prevented by sealing this hole part.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-091986 filed on Mar. 30, 2007, including specification, drawings and claims for patent, are incorporated herein by reference in its entirety.

The invention claimed is:

1. A manufacturing method for an electrode-membrane-frame assembly used in a polymer electrolyte fuel cell assembled by stacking a plurality of single cell modules each comprising an electrode-membrane-frame assembly which is formed of a membrane electrode assembly constituted by binding an anode electrode to one surface of a polymer electrolyte membrane member and binding a cathode electrode to the other surface of the electrolyte membrane member and a frame which contains a gas supply section that supplies fuel gas and oxidizer gas to the anode electrode and the cathode electrode respectively and which sandwiches the periphery of the membrane electrode assembly to hold the membrane electrode assembly; and a pair of separators which sandwich the electrode-membrane-frame assembly from the anode side and the cathode side, the method comprising:

arranging a first frame member and the membrane electrode assembly in a first mold for injection molding such that an edge of the electrolyte membrane member in the membrane electrode assembly is arranged on the first frame member;

arranging a second mold on the first mold to form a resin flow passage for forming a second frame member, the second mold being in contact with the first frame member by interposing the electrolyte membrane member, and pressing and fixing a part of the edge of the electrolyte membrane member to the first frame member by a presser member mounted on the second mold;

injecting a molding resin material into the resin flow passage to fill the resin material in the resin flow passage in the condition where the electrolyte membrane member is fixed by the presser member; and curing the filled resin material to form a second frame member which is bound to the first frame member integrally in the resin flow passage and sandwiches the edge of the electrolyte membrane member between the second frame member and the first frame member to hold the edge of the electrolyte membrane member.

2. The manufacturing method for the electrode-membrane-frame assembly as defined in claim 1, wherein the fixation of the electrolyte membrane member is carried out by sandwiching a first position between the first and second molds to hold the first position along the periphery of the anode electrode or the cathode electrode, the first position being in contact with the outer periphery of the electrode in the electrolyte membrane member, and by pressing and fixing a plurality of second positions on the outside of the first position in the edge of the electrolyte membrane member to the first frame member by a plurality of the presser members.

3. The manufacturing method for the electrode-membrane-frame assembly as defined in claim 2, wherein the injection of the resin material into the resin flow passage is carried out through an injection part which is arranged between the first position and second position.

4. The manufacturing method for the electrode-membrane-frame assembly as defined in claim 2, wherein the fixation of the electrolyte membrane member by the plurality of presser members is carried out at the plurality of second positions arranged at specified distance intervals along the outer periphery of the electrolyte membrane member.

5. The manufacturing method for an electrode-membrane-frame assembly as defined in claim 1, wherein the first frame member is provided with a step part to arrange the edge of the electrolyte membrane member and the resin material is filled in the step part so as to fill the step part in a condition where the edge of the electrolyte membrane member is arranged on a lower step surface in the step part and the electrolyte membrane member is fixed to the lower step surface by the presser member, thereby forming the second frame member.

6. The manufacturing method for the electrode-membrane-frame assembly as defined in claim 5, wherein the first frame member is further provided with an injection step part at a position opposite to the resin material injection part in the upper step surface of the step part, the step difference between the lower step surface of the step part and the injection step part is made to be equal or larger than a thickness of the electrolyte membrane member; and the resin material injected from the injection part is allowed to flow onto the lower step surface of the step part through the injection step part in the injection of the resin material into the resin flow passage.

* * * * *

UNITED STATES PATENT AND TRADEMARK OFFICE
CERTIFICATE OF CORRECTION

| | | |
|---|---|---|
| PATENT NO. | : 7,931,999 B2 | Page 1 of 1 |
| APPLICATION NO. | : 12/307014 | |
| DATED | : April 26, 2011 | |
| INVENTOR(S) | : Takashi Morimoto et al. | |

It is certified that error appears in the above-identified patent and that said Letters Patent is hereby corrected as shown below:

Title Page, Item (56) under the heading "OTHER PUBLICATIONS," please insert --International Search Report issued July 15, 2008 in the International (PCT) Application of which the present application is the U.S. National Stage.--

Signed and Sealed this
First Day of November, 2011

David J. Kappos
*Director of the United States Patent and Trademark Office*